(12) United States Patent
Reisman et al.

(10) Patent No.: US 8,654,104 B2
(45) Date of Patent: *Feb. 18, 2014

(54) 3D MANIPULATION USING APPLIED PRESSURE

(71) Applicant: Perceptive Pixel, Inc., Redmond, WA (US)

(72) Inventors: Jason L. Reisman, Brooklyn, NY (US); Philip L. Davidson, New York, NY (US); Jefferson Y. Han, Holliswood, NY (US)

(73) Assignee: Perceptive Pixel Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/947,966

(22) Filed: Jul. 22, 2013

(65) Prior Publication Data

US 2013/0307827 A1 Nov. 21, 2013

Related U.S. Application Data

(63) Continuation of application No. 12/753,095, filed on Apr. 1, 2010, now Pat. No. 8,493,384.

(60) Provisional application No. 61/165,853, filed on Apr. 1, 2009, provisional application No. 61/248,670, filed on Oct. 5, 2009.

(51) Int. Cl.
*G06F 3/042* (2006.01)
*G06T 15/00* (2011.01)
*G06T 15/10* (2011.01)
*G06T 15/20* (2011.01)
*G06F 3/048* (2013.01)

(52) U.S. Cl.
USPC ............ 345/175; 345/419; 345/427; 715/848

(58) Field of Classification Search
None
See application file for complete search history.

(56) References Cited

U.S. PATENT DOCUMENTS 3,200,701 A 8/1965 White
3,673,327 A 6/1972 Johnson et al.
3,846,826 A 11/1974 Mueller (Continued)

OTHER PUBLICATIONS

Buxton, W., Hill, R., and Rowley, P., "Issues and Techniques in Touch-Sensitive Tablet Input," Proceedings of the 12th Annual Conference on Computer Graphics and Interactive Techniques SIGGRAPH '85, ACM Press, New York, N.Y., Jul. 1985, 15 pages.

(Continued)

*Primary Examiner* — Kee M Tung
*Assistant Examiner* — Haixia Du
(74) *Attorney, Agent, or Firm* — Alleman Hall McCoy Russell & Tuttle LLP

(57) ABSTRACT

Placement by one or more input mechanisms of a touch point of a mufti-touch display device that is displaying a three-dimensional object is detected. A two-dimensional location of the touch point on the multi-touch display device is determined, and the touch point is matched with a three-dimensional contact point on a surface of the three-dimensional object that is projected for display onto the image plane of the camera at the two-dimensional location of the touch point. A change in applied pressure at the touch point is detected, and a target depth value for the contact point is determined based on the changed in applied pressure. A solver is used to calculate a three-dimensional transformation of the three-dimensional object using an algorithm that reduces a difference between a depth value of the contact point after object transformation and the target depth value.

20 Claims, 19 Drawing Sheets

(56) References Cited

U.S. PATENT DOCUMENTS

| | | | |
|---|---|---|---|
| 4,121,129 | A | 10/1978 | Maloney |
| 4,134,063 | A | 1/1979 | Nicol et al. |
| 4,346,376 | A | 8/1982 | Mallos |
| 4,484,179 | A | 11/1984 | Kasday |
| 4,668,861 | A | 5/1987 | White |
| 5,483,261 | A | 1/1996 | Yasutake |
| 5,825,352 | A | 10/1998 | Bisset et al. |
| 6,323,846 | B1 | 11/2001 | Westerman et al. |
| 6,597,347 | B1 | 7/2003 | Yasutake |
| 7,030,861 | B1 | 4/2006 | Westerman et al. |
| 2002/0036618 | A1 | 3/2002 | Wakai et al. |
| 2002/0158838 | A1 | 10/2002 | Smith et al. |
| 2003/0128192 | A1 | 7/2003 | van Os |
| 2004/0164956 | A1 | 8/2004 | Yamaguchi et al. |
| 2006/0026521 | A1 | 2/2006 | Hotelling et al. |
| 2006/0026535 | A1 | 2/2006 | Hotelling et al. |
| 2006/0026536 | A1 | 2/2006 | Hotelling et al. |
| 2006/0033724 | A1 | 2/2006 | Chaudhri et al. |
| 2006/0053387 | A1 | 3/2006 | Ording |
| 2006/0085757 | A1 | 4/2006 | Andre et al. |
| 2006/0161870 | A1 | 7/2006 | Hotelling et al. |
| 2006/0161871 | A1 | 7/2006 | Hotelling et al. |
| 2007/0252821 | A1 | 11/2007 | Hollemans et al. |
| 2008/0029691 | A1 | 2/2008 | Han |
| 2008/0165141 | A1 | 7/2008 | Christie |
| 2008/0180404 | A1 | 7/2008 | Han et al. |
| 2008/0180405 | A1 | 7/2008 | Han et al. |
| 2008/0180406 | A1 | 7/2008 | Han et al. |
| 2010/0162181 | A1 | 6/2010 | Shiplacoff et al. |
| 2011/0041098 | A1 | 2/2011 | Kajiya et al. |
| 2011/0164029 | A1 | 7/2011 | King et al. |
| 2011/0169832 | A1 | 7/2011 | Brown et al. |
| 2011/0210943 | A1 | 9/2011 | Zaliva |
| 2011/0227947 | A1 | 9/2011 | Benko et al. |
| 2011/0279397 | A1 | 11/2011 | Rimon et al. |

OTHER PUBLICATIONS

Michael Chen, "A Study in Interactive 3-D Rotation Using 2-D Control Devices," Computer Graphics, vol. 22, No. 4, 121-129, Aug. 1988.

K. Shoemake, "ARCBALL: A User Interface for Specifying Three-Dimensional Orientation Using a Mouse," Proceedings of the conference on Graphics interface '92, pp. 151-156, May 1992.

Ken Hinckley, "Haptic Issues for Virtual Manipulation," A Dissertation Presented to the Faculty of the School of Engineering and Applied Science at the University of Virginia, section 6.1-6.3, Dec. 1996, from the website http://research.microsoft.com/Users/kenh/thesis/front.htm.

Dietz, P. and Leigh, D., "DiamondTouch: A Multi-User Touch Technology," Proceedings of the 14th Annual ACM Symposium on User Interface Software and Technology, Orlando, Fla., Nov. 2001, UIST '01. ACM Press, New York, N.Y., pp. 219-226.

Lee, S., Buxton, W. and Smith, K. C., "A Multi-Touch Three Dimensional Touch-Sensitive Tablet," Proceedings of the SIGCHI Conference on Human Factors in Computing Systems (San Francisco, Calif., United States), CHI '85. ACM Press, New York, N.Y., pp. 21-25, Apr. 1985.

Malik, S. and Laszlo, J., "Visual Touchpad: A Two-Handed Gestural Input Device," Proceedings of the 6th International Conference on Multimodal Interfaces, State College, Pa., USA, Oct. 2004), ICMI '04. ACM Press, New York, N.Y., pp. 289-296.

Rekimoto, J., "SmartSkin: An Infrastructure for Freehand Manipulation on Interactive Surfaces," Proceedings of the SIGCHI Conference on Human Factors in Computing Systems, CHI '02, ACM Press, New York, N.Y., 113-120, Apr. 2002.

Westerman, W., Elias, J. G., and Hedge, A., "Multi-Touch: A New Tactile 2-D Gesture Interface for Human-Computer Interaction," Proceedings of the Human Factors and Ergonomics Society 45th Annual Meeting, Minneapolis/St. Paul, Minn., Oct. 2001, 632-636.

Wilson, A. D., "TouchLight: An Imaging Touch Screen and Display for Gesture-Based Interaction," Proceedings of the 6th International Conference on Multimodal Interfaces, State College, Pa., USA, Oct. 2004, ICMI '04. ACM Press, New York, N.Y., pp. 69-76.

Wu, M. and Balakrishnan, R., "Multi-Finger and Whole Hand Gestural Interaction Techniques for Multi-User Tabletop Displays," Proceedings of the 16th Annual ACM Symposium on User Interface Software and Technology, Vancouver, Canada, Nov. 2003, UIST '03, ACM Press, New York, N.Y., 193-202.

R. Balakrishnan and K. Hinckley, "Symmetric bimanual interaction," CHI '00: Proceedings of the SIGCHI conference on Human factors in computing systems, pp. 33-40, Apr. 2000.

R. Balakrishnan and G. Kurtenbach, "Exploring bimanual camera control and object manipulation in 3D graphics interfaces," CHI '99: Proceedings of the SIGCHI conference on Human factors in computing systems, pp. 56-63, May 1999.

Y. Guiard, "Asymmetric division of labor in human skilled bimanual action: The kinetic chain as a model," Journal of Motor Behavior, 19(4): pp. 486-517, Dec. 1987.

K. Hinckley, R. Pausch, J. C. Goble, and N. F. Kassel!, "Passive real-world interface props for neurosurgical visualization," CHI '94: Proceedings of the SIGCHI conference on Human factors in computing systems, 452-458, Apr. 1994.

G. Kurtenbach, G. Fitzmaurice, T. Baudel, and B. Buxton, "The design of a GUI paradigm based on Tablets, Two-hands, and Transparency," CHI '97: Proceedings of the SIGCHI conference on Human factors in computing systems, 35-42, Mar. 1997.

I. Llamas, B. Kim, J. Gargus, J. Rossignac, and C. D. Shaw, "Twister: a space-warp operator for the two-handed editing of 3D shapes," ACM Transactions on Graphics, 22(3):663-668, Jul. 2003.

R. Zeleznik, A. Forsberg, and P. Strauss, "Two pointer input for 3D interaction," SI3D '97: Proceedings of the 1997 symposium on Interactive 3D graphics, 115-120, Apr. 1997.

T. Beier and S. Neely, "Feature-based image metamorphosis," Computer Graphics (SIGGRAPH Conference Proceedings), pp. 35-42, Jul. 1992.

T. Igarashi T. Moscovich, and J. F. Hughes, "As-rigid-as possible shape manipulation," ACM Transactions on Graphics, 24(3):1134-1141, Jul. 2005.

D. L. James and D. K. Pai, "ArtDefo: accurate real time deformable objects," Computer Graphics (SIGGRAPH Conference Proceedings), pp. 65-72, Aug. 1999.

Agarawala, A. and Balakrishnan, R., "Keepin' it real: pushing the desktop metaphor with physics, piles and the pen," Proceedings of SIGCHI 2006, pp. 1283-1292. ACM Press, Apr. 2006.

Beaudouin-Lafon, M., "Novel interaction techniques for overlapping windows," Proceedings of UIST 2001, pp. 153-154. ACM Press, Nov. 2001.

Dragicevic, P., "Combining crossing-based and paper-based interaction paradigms for dragging and dropping between overlapping windows," Proceedings of UIST 2004, pp. 193-196. ACM Press, Oct. 2004.

Mander, R., Salomon, G., and Wong, Y. Y., "A 'pile' metaphor for supporting casual organization of information," Proceedings of SIGCHI 1992, pp. 627-634. ACM Press, May 1992.

Ramos, G., Boulos, M., and Balakrishnan, R., "Pressure widgets," Proceedings of SIGCHI 2004, pp. 487-494, ACM Press, Apr. 2004.

Ramos, G., et al., "Tumble! Splat! helping users access and manipulate occluded content in 2D drawings," Proceedings of AVI 2006, pp. 428-435, ACM Press, May 2006.

Terrenghi, L., Kirk, D., Sellen, A., and Izadi, S., "Affordances for manipulation of physical versus digital media on interactive surfaces," Proceedings of SIGCH1 2007, pp. 1157-1166, ACM Press, Apr. 2007.

Frohlich, B., Tramberend, H., Beers, A., Agrawala, M., and Baraff, D., "Physically-Based Manipulation on the Responsive Workbench," Proceedings of the IEEE Virtual Reality 2000 Conference, Mar. 2000, VR. IEEE Computer Society, Washington, DC, 5.

Gleicher, M. and Witkin, A., "Through-the-Lens Camera Control," Proceedings of the 19th Annual Conference on Computer Graphics and Interactive Techniques J.J. Thomas, Ed. SIGGRAPH '92. ACM, New York, NY, 331-340, Jul. 1992.

Grossman, T., Wigdor, D., and Balakrishnan, R., "Multi-finger gestural interaction with 3d volumetric displays," Proceedings of the 17th Annual ACM Symposium on User Interface Software and Tech-

(56) References Cited

OTHER PUBLICATIONS nology, Santa Fe, NM, USA, Oct. 2004, UIST '04, ACM, New York, NY, 61-70. DOI= http://doi.acm.org/10.1145/1029632.1029644.

Hancock, M., Carpendale, S., and Cockburn, A., "Shallow-depth 3d interaction: design and evaluation of one-, two- and three-touch techniques," Proceedings of the SIGCHI Conference on Human Factors in Computing Systems (San Jose, California, USA, Apr.-May 2007, CHI '07, ACM, New York, NY, 1147-1156.

Kyung, M., Kim, M., and Hong, S.J., "A new approach to through-the-lens camera control," Graph, Models Image Process, 58, 3, May 1996, 262-285, 1996.

Nielsen, G.M. and Olsen, D.R., "Direct manipulation techniques for 3D objects using 2D locator devices," Proceedings of the 1986 Workshop on Interactive 3D graphics (Chapel Hill, North Carolina, United States), F. Crow and S.M. Pizer, Eds. SI3D '86, ACM, New York, NY, 175-182, Jan. 1987.

Nocedal, J. and Wright, M., "Numerical Optimaztion," Springer, New York, Jan. 1999.

Snibbe, S.S., Herndon, K.P., Robbins, D.C., Conner, D.B., and van Dam, A., "Using deformations to explore 3D widget design," Proceedings of the 19th Annual Conference on Computer Graphics and interactive Techniques, J.J. Thomas, Ed., SIGGRAPH '92, ACM, New York, NY, 351-352, Jul. 1992.

Wilson, A.D., Izadi, S., Hilliges, O., Garcia-Mendoza, A., and Kirk, D., "Bringing physics to the surface," Proceedings of the 21st Annual ACM Symposium on User Interface Software and Technology (Monterey, CA, USA, Oct. 2008, UIST '08, ACM, New York, NY, 67-76.

Notice of Allowance mailed Feb. 21, 2012, in U.S. Appl. No. 12/753,085, 11 pages.

Notice of Allowance mailed Feb. 21, 2012, in U.S. Appl. No. 12/753,093, 11 pages.

Reisman et al., "A Screen-Space Formulation for 2D and 3D Direct Manipulation", UIST '09, Oct. 4-7, 2009, Victoria, British Columbia, Canada, 10 pages.

Gingold et al., "A Direct Texture Placement and Editing Interface", UIST '06, Oct. 15-18, 2006, Montreux, Switzerland, 9 pages.

Davidson et al., "Extending 2D Object Arrangement with Pressure-Sensitive Layering Cues", UIST '08, Oct. 19-22, 2008, Monterey, California, 4 pages.

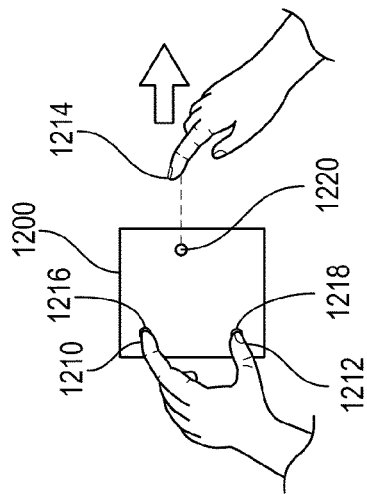
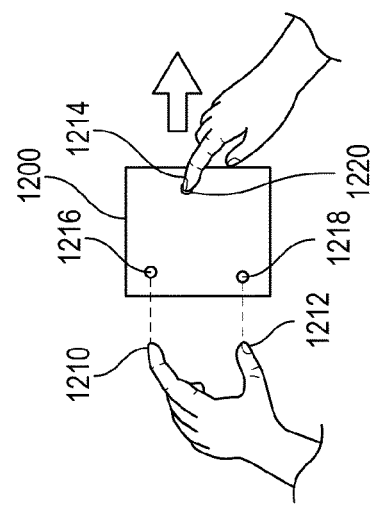
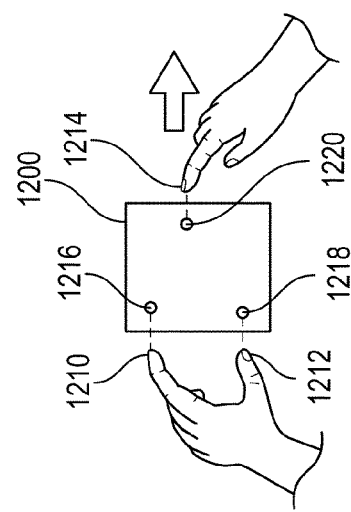

3D MANIPULATION USING APPLIED PRESSURE

CROSS-REFERENCE TO RELATED APPLICATIONS

This application is a continuation of U.S. patent application Ser. No. 12/753,095, filed Apr. 1, 2010 and entitled "3D Manipulation Using Applied Pressure," which claims priority to U.S. Provisional Patent Application Ser. No. 61/165,853, filed on Apr. 1, 2009 and entitled "Screen-Space Formulation for 2D and 3D Manipulation," and U.S. Provisional Patent Application Ser. No. 61/248,670, filed on Oct. 5, 2009 and entitled "Screen-Space Formulation for 2D and 3D Manipulation," with each of these three applications being incorporated herein by reference in their entirety for all purposes.

BACKGROUND

Some touch screen device types, such as touch enabled computer monitors, personal digital assistants, media players, and cellular telephones, enable users to interact with onscreen elements by touching a display with a finger or a stylus. Single-touch devices are capable of recognizing a single point of contact, and they enable users to perform a variety of two-dimensional (2D) interactions such as moving on-screen objects through a so-called "dragging" operation.

More recently, devices have emerged that recognize more than one simultaneous point of contact for interacting with 2D on-screen objects. Such so-called "multi-touch" interfaces generally support single-touch interactions, as well as multiple-touch (generally two-fingered) gestures These multi-touch gestures are sometimes known as rotate-scale-translate (RST) interactions because these interactions generally allow a user to spin, slide, or resize 2D objects in a 2D plane. One commonly used multi-touch gesture involves a user touching a 2D object at two or more points on a display and then revolving those points relative to each other to effect virtual rotation of the object, similar to the manner in which a person could spin a photograph or a piece of paper lying on a tabletop. Another commonly used multi-touch gesture involves a user touching a 2D object at two points on a display, and then spreading or pinching the gap between the two point to enlarge or shrink the visible size of the object.

SUMMARY

In one general aspect, placement by one or more input mechanisms of a touch point on a multi-touch display that is displaying a three-dimensional object is detected. A two-dimensional location of the touch point on the multi-touch display device is determined, and the touch point is matched with a three-dimensional contact point on a surface of the three-dimensional object that is projected for display onto the image plane of the camera at the two-dimensional location of the touch point. A change in applied pressure at the touch point is detected, and a target depth value for the contact point is determined based on the change in applied pressure. A solver is used to calculate a three-dimensional transformation of the three-dimensional object using an algorithm that reduces a difference between a depth value of the contact point after object transformation and the target depth value.

The various aspects, implementations, and features disclosed may be implemented using, for example, one or more of a method, an apparatus, a system, tool, or processing device for performing a method, a program or other set of instructions, an apparatus that includes a program or a set of instructions, and a computer program stored on a tangible, computer-readable storage medium. The tangible, computer-readable storage medium may include, for example, instructions that, when executed, cause a computer to perform acts specified by the instructions.

The details of one or more implementations are set forth in the accompanying drawings and the description below. Other features will be apparent from the description and the drawings, and from the claims.

DESCRIPTION OF DRAWINGS

FIGS. 12A-12C are a sequence of diagrams that illustrate different distributions of error among touch points placed on a 2D display interface.

DETAILED DESCRIPTION

A 2D display interface device (e.g., a multi-touch capable display interface device) enables users to manipulate a simulated three-dimensional (3D) object displayed on a 2D display interface by "touching" one or more points on the displayed representation of the 3D object, and then moving those touch points about in the generally 2D plane of the interface. The user may "touch" the one or more points on the displayed representation of the 3D object by physically contacting the corresponding points in the 2D display interface with a finger, a stylus or some other input mechanism and/or by hovering the finger, the stylus or the other input mechanism around, or otherwise in the vicinity of, the corresponding points in the 2D display interface. The 2D display interface device determines the 2D positions of the touch points and identifies the corresponding 3D points "touched" on the 3D object (i.e., the contact point on the surface of the 3D object that are displayed directly underneath or substantially underneath the touch points placed on the 2D display interface). As the user moves the touch points about the substantially 2D interface, the 2D display interface device rotates, scales, and/or translates the 3D object in order to substantially maintain a display of the same 3D contact points under the same, respective, 2D touch points. Typically, the moving by the user of a touch point from one location to another on the 2D display interface is accomplished by the user moving the touch point while maintaining a substantially continuous "touch" of the screen.

One appeal of a 2D display interface device that enables user manipulation of objects in the above-described manner is that the user may be given the impression that the user is directly manipulating the 3D object in the same way that he/she would manipulate an object in the real world (i.e., the non-simulated world). For example, if the user uses his/her fingers to "touch" on object displayed on the interface, the user can slide his/her fingers along the surface of the 2D display interface, and the 2D display interface device reacts by manipulating (e.g., rotating, translating, and scaling) the 3D object so that the same point on the surface of the object remains substantially underneath the same fingertip. Since the user is thereby able to manipulate the object so that it moves in a predictable and realistic fashion, the user may be given the impression of "gripping" and manipulating a real object (i.e., a non-simulated 3D object). Direct manipulation can essentially provide an intuitive and controllable mapping between points in an object's local space (i.e., points in object-space) and point on the screen of the 2D display interface (i.e., points in screen-space), without the need for any explicit gesture processing.

Figure 1:
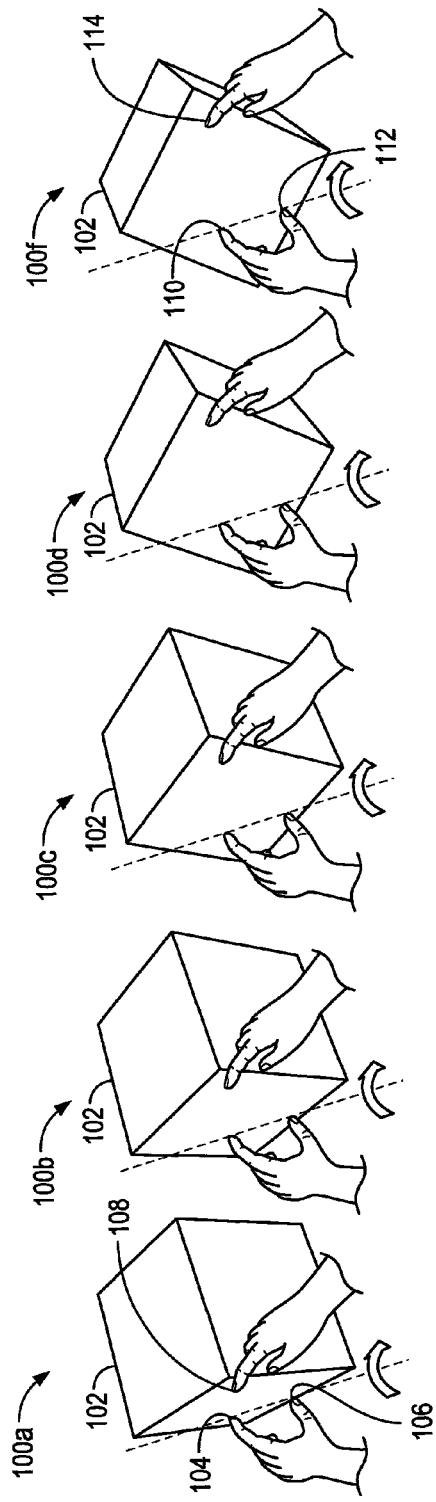
FIG. 1 is a sequenced of diagrams that illustrate a user manipulation of a 3D object displayed on a 2D display interface.

Referring now to FIG. 1, a sequence of images 100a-100f illustrate an example of a direct manipulation of a simulated 3D object, a cube 102, as it may be displayed on a 2D multi-touch enabled display interface of a computer. In the image 100a, the cube 102 is displayed in an initial position, wherein the user touches the interface with his or her fingers at a touch point 104, a touch point 106, and a touch point 108. Each of the touch points 104-108 has a corresponding contact point, which is the location on the surface of the 3D object that is displayed at the given touch point. Examples of touch points and corresponding contact points will be descried further below in reference to FIGS. 2A-2F.

As is shown sequentially in the images 100b-100d, the user moves the touch points 104, 106 and 108 across the 2D display interface by sliding his/her fingers across the 2D plane of the interface. The cube 102 is animated by the 2D display interface device to rotate, translate and/or scale the cube 102 such that the touch points appear to reaming substantially at the same contact points on the cube 102 as the user's fingers move across the interface. In the image 100f, the user's fingers have arrived at a new location 110 for touch point 104, a new location 112 for touch point 106, and a new location 114 for touch point 108, and the cube 102 is brought into a corresponding orientation (i.e., a location and rotational orientation) such that the same contact points remain displayed substantially underneath their respective touch points at the new locations 110-114.

Figure 2A:
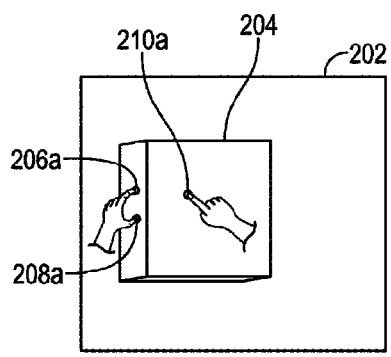
FIGS. 2A-2F are a sequence of diagrams that illustrate a user manipulation of a 3D object displayed on a 2D display interface, as viewed from a perspective of the user and from an oblique world-space perspective.

FIGS. 2A-2F are a sequence of diagrams that illustrate a direct manipulation of a 3D object by a user through the placement and movement of touch points on a 2D display interface. FIG. 2A shows the user having placed three touch points 206a, 208a and 210a on a 2D display interface 202 that appear to touch a simulated cube 204. The view shown in FIG. 2A is taken from the user's perspective. The location of each of the touch points 206a, 208a and 210a can be represented in screen-space.

Screen-space is a 2D space that is used to represent locations on the 2D display interface (i.e., on the "screen"). A location in screen-space may be represented by two values such as, for example, an x-axis value and y-axis value. The values may be expressed, for example, in pixels.

Figure 2B:
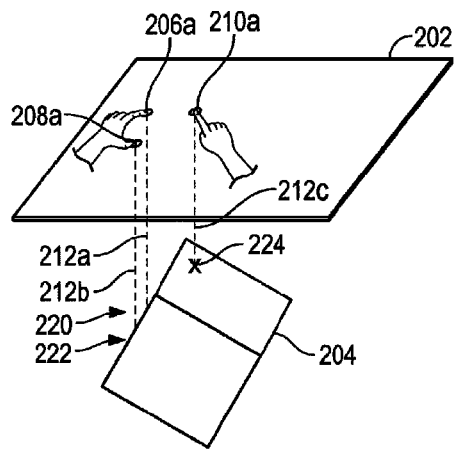

FIG. 2B shows the interface 202 and the cube 204 in world-space from an oblique angle such that it is clear that the view shown in FIG. 2A corresponds to a projection of the cube 204 onto a window or a camera image plane of the 2D display interface 202. Visible again are the touch points 206a-210a and the cube 204. Also visible are a collection of normal projection lines 212a-212c that, for purposes of illustration, extend perpendicular from the plane of the interface 202 into world-space, until the projection lines 212a-212c intersect the cube 204. The points on the cube 204 at which the normal projection lines 212a-212c encounter the cube 204 correspond to a contact point 220 (not visible in this view), a contact point 222 (not visible in this view), and a contact point 224. As such, the contact points 220, 222 and 224 underlie the touch points 206a, 208a and 210a, respectively, from the user's point of view, as shown in FIG. 2A. In other words, the screen-space location of a contact point 220, 222, 224 (i.e., the location of the contact point 220, 222, 224 when projected onto the plane of the interface 202) is equal to the screen-space location of its respective touch point 206a, 208a, 210a. As shown in FIG. 2B, world-space is distinct from screen-space. The described techniques for direct manipulation of a 3D object further distinguish between world-space and object-space.

Object-space is a 3D spaced used to represent location on a 3D object relative to an origin affixed to the 3D object such that the origin moves with the 3D object. Object-space locations can be expressed by three values that represent, for example, displacements from the object origin along an x-axis, a y-axis, and a z-axis. Notably, a location of a point on a 3D object expressed in object-space does not change with movement of the 3D object.

World-space is a 3D space used to represent the location of a 3D object relative to a fixed origin. Notably, a location of a point on a 3D object that is expressed in world-space changes as the 3D object moves relative to the fixed origin. The 2D display interface can be thought of as a display of a view seen through a camera or a window of a world in which the 3D object is positioned. The image of the 3D object displayed by the 2D interface corresponds to a projection of the 3D object in world-space onto the image plane of the camera or the window. Locations in world-space can be expressed by three values that represent displacements from the fixed origin. A point on an object in object-space can be transformed into a point of world-space when the position and rotational orientation of the 3D object in world-space are known. After the point is transformed into world-space, the point can then be transformed into screen-space by taking a projection of the point onto the image plane of the camera or the window.

For clarity and ease of exposition, a point at which the user "touches" the 2D display interface is hereinafter referred to as a "touch point" and is positioned in screen-space. The corresponding point on the 3D object that the user appears to "touch" because it is displayed underneath the touch point is hereinafter referred to as a "contact point" and is positioned in object-space.

Figure 2C:
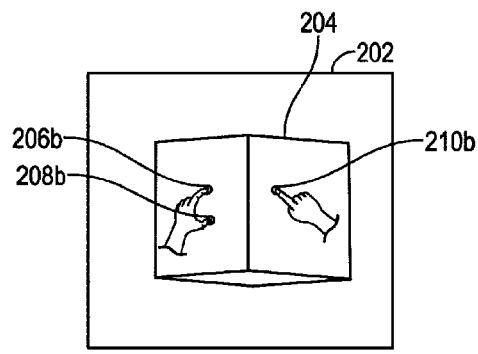
Figure 2D:
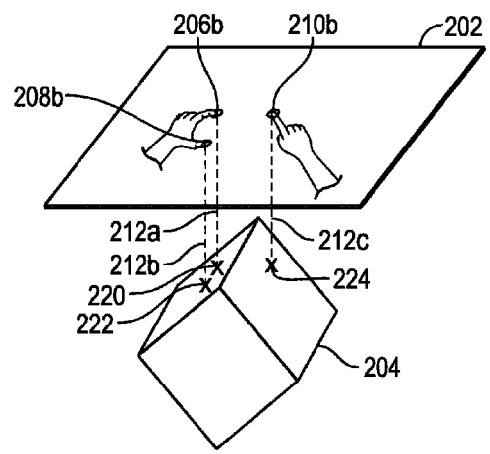

Referring now to FIGS. 2C and 2D, the user has moved his or her fingers to trigger an example transformation of the cube 204 by the interface device (e.g., by sliding his fingers across the display interface 202 while maintaining a continuous or a substantially continuous touching of the display interface 202). As shown in the user-perspective view of FIG. 2C, the user moved his or her fingers in a rightward direction, across a portion of the interface 202. Movement of the user's fingers resulted in the movement of touch points 206a, 208a, and 210a from their position displayed in FIGS. 2A and 2B to their new positions 206b, 208b, and 210b, respectively. As seen in the oblique world-space view of FIG. 2D, when the user's fingers moved to the new touch point locations 206b, 208b and 210b, the 2D display interface device transformed the cube 204 to ensure that the contact points 220, 222 and 224 remain displayed underneath the same respective touch points 206a, 208a and 210a.

In general, the manipulation of the simulated 3D object is achieved by transforming the 3D object (i.e., changing its location and rotational orientation in world-space) when the user moves touch points from a first location to a second location on the 2D display interface. Specifically, the location, rotational orientation and sometimes scaling of the 3D object in world-space is changed in response to the user moving touch points such that the contact points on the object that appear to be touched by the user remain displayed substantially underneath the same touch points as those touch points are moved by the user from one location to another location on the 2D display interface.

For example, when a user uses his/her fingers to place and move touch points, the manipulation of the 3D object is achieved by transforming the 3D object such that the same contact point displayed by the pixels underneath a fingertip at the first location is then displayed by the pixels underneath the same fingertip at the second location when the fingertip moves from the first location to the second location. This transformation may involve, for example, solving for transform values that meet screen-space constraints. That is, the user placement and movement of touch points controls the object's projection onto the camera's image plane. Notably, while FIGS. 1 and 2A-2F (and other FIGS in this document) illustrate 2D display interfaces in which a user uses his/her fingers to place and move touch points, other implementations may differ with respect to input mechanism. For example, in another implementation, a stylus and/or other pointer mechanism may be used instead of or in addition to fingers to place and move touch points.

Referring back to FIGS. 2C and 2D, the cube 204 is transformed (e.g., by rotating and translating the cube) in world-space in such a way that the contact points 220-224, when projected onto the image plane or window of display interface 202, are kept substantially underneath the new touch point locations 206b, 208b, and 210b (as shown in FIG. 2D by normal projection lines 212a-212c). That is, the cube 204 is transformed in world-space such that the screen-space location of a contact point 220, 222, 224 is substantially equal to the new screen-space location 206b, 208b, 210b of its respective touch point 206a, 208a 210a.

Figure 2E:
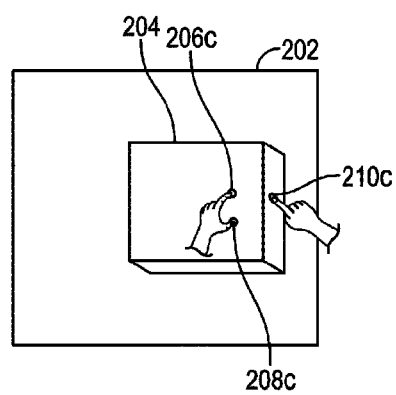
Figure 2F:
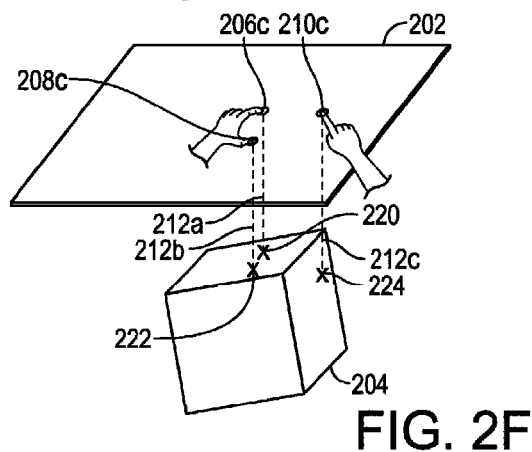

As shown in FIGS. 2E and 2F, the user continues the rightward movement of his or her fingers across the 2D surface of the interface 202, thereby triggering a nearly 90-degree rotation of the cube 204 from its original position shown in FIGS. 2A and 2B. The user's fingers now contact the interface 202 at a collection of new touch point locations 206c, 208c, and 210c, and the cube 204 has been further transformed (e.g., rotated) in world-space to keep the projection of the contact points 220-224 onto the image plane or window of display interface 202 substantially underneath the new touch point locations 206c, 208c, and 210c. Specifically, the cube 204 has been transformed in world-space such that the screen-space location of a contact point 220, 222, 224 is substantially equal to the new screen-space location 206c, 208c, 210c of its respective touch point 206a, 208a, 210a.

Figure 3:
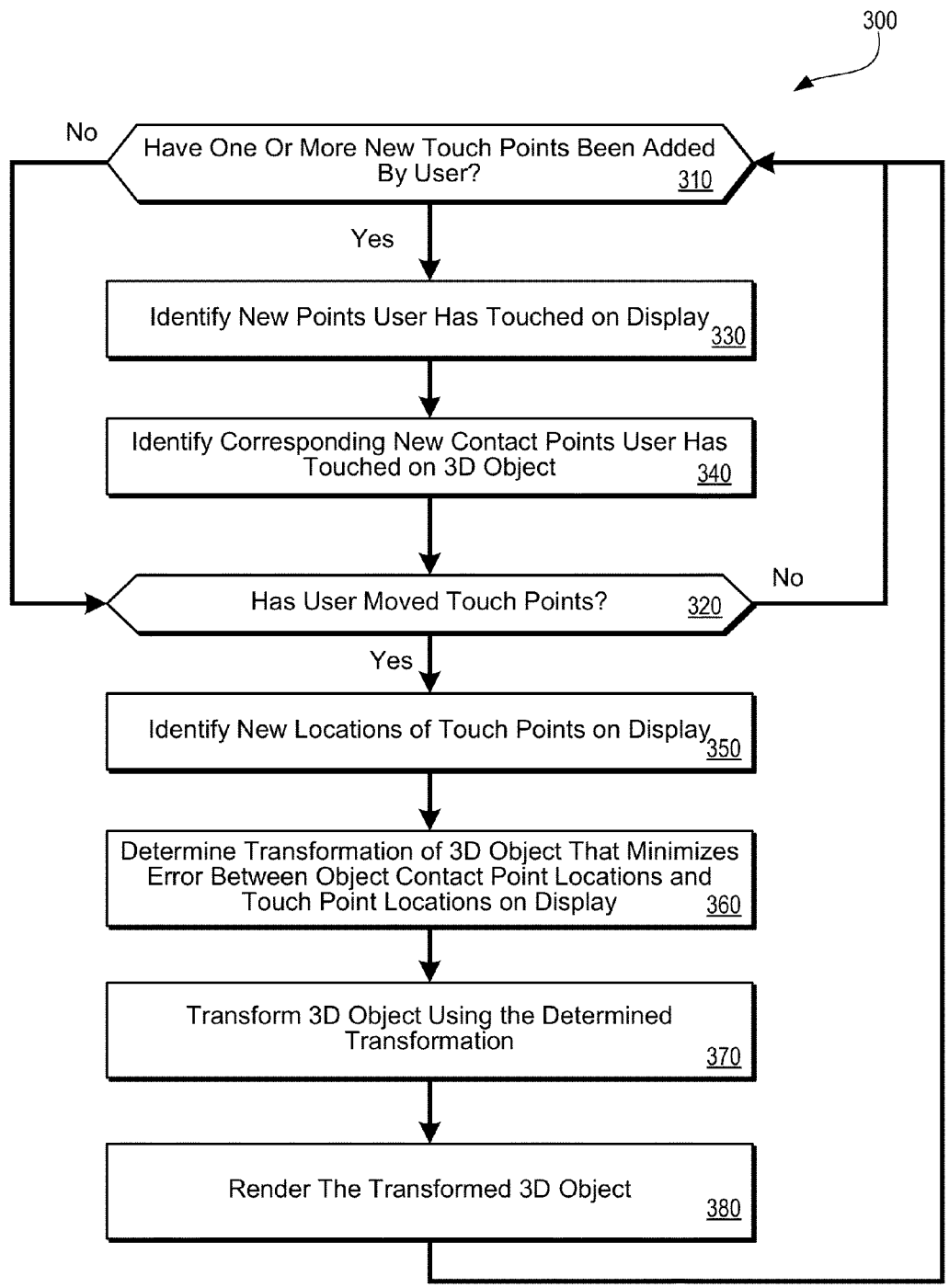
FIG. 3 is a flow diagram of a process for enabling a user to manipulate 3D objects through a 2D display interface.

FIG. 3 is a flow diagram of an example process 300 for moving simulated 3D objects in response to one or more inputs on a substantially 2D display interface. In some implementations, the process 300 may be the process used to transform (i.e., rotate, translate and/or scale) the 3D objects of FIGS. 1 and 2A-2F. The process 300 may be implemented by a 2D display interface device such as, for example, a multi-touch display device.

A determination (310) is made whether one or more new touch points have been added by the user. If the user has not yet interacted with the 2D display interface, then this determination will detect the user touching the screen for the first time (i.e., the user adding a new touch point where before no touch point existed). If the user has already placed at least one touch point on the 2D display interface, then this determination will detect the addition of a new touch point. The addition of a new touch point may, for example, correspond to the user changing from touching the displayed object with two fingers (i.e., two touch points) to touching the displayed object with three fingers (i.e., three touch points).

While operation 310 detects the placement of new touch points on the screen, operation 320 detects movement of touch points already placed on the screen. If no touch point are detected as being moved (320), then the process 300 returns to operation 310, and the 2D display interface device continues monitoring for the addition of new touch points. In situations where there are no touch points to move (e.g., the user is not touching the screen), the process 300 still functions in that the 2D display interface device will simply not detect movement of touch points when no touch points are available to be moved. The 2D display interface device may, for example, monitor for changes in the status quo of touch point placement and movement by cycling between operations 310 and 320 until either one or more touch points are moved or one or more new touch points are added to the set of touch points currently placed on the screen.

If, however, one or more touch points have been determined (310) to have been added, then the new point or points the user has touched on the display are identified (330). For example, the process 300 may identify (330) the touch points 206a, 208a, and 210a of FIGS. 2A and 2B upon them being newly placed on the 2D display interface 202 by the user. Identification of touch points 206a, 208a, and 210a may include using multi-touch display technologies to detect proximity of a finger and/or a stylus tip to a portion of the 2D display interface 202 and then identifying, for each detected portion, a corresponding location in screen-space (e.g., for each touch point, ax x axis and a y axis displacement expressed in pixels may be identified).

A contact point on the 3D object is also identified for each newly added touch point (340). For example, the contact points 220, 222 and 224 of FIGS. 2B, 2D, and 2E may be identified as corresponding to the touch points 206a, 208a and 210a, respectively. Stated differently, identifying a contact point for each newly added touch point includes identifying a point on the 3D object in object-space that has a screen-space location (i.e., a location of the projection of the point on the 3D object onto the image plane of the camera in world-space) that is the same as or substantially the same as that of the newly added touch point. A screen-space location of a contact point is also sometimes referred to herein as a screen-space projection of the contact point.

In some implementations, if the newly added touch point is not positioned on the display of the 3D object in the 2D display interface, the touch point may be disregarded with respect to transforming the 3D object since the user has effectively "missed" the 3D object with his touch, and, thus, movement of that touch point does not cause corresponding movement of the 3D object. In this case, no corresponding contact point exists for the touch point. However, if the touch point is subsequently moved to a location over the display of the 3D object, a corresponding contact point can then be found and further movement of the touch point can result in movement of the 3D object via transformation of the 3D object as described below. In other implementations, the 3D object may be transformed to ensure that any touch point on the 2D display interface, regardless of its location, will contact the 3D object and have a corresponding contact point.

If movement of one or more touch points is detected (320), then the new screen-space locations of the touch points on the display are identified (350). For example, if the user has moved the touch points 206a, 208a, 210a from the locations shown in FIG. 2A to the new locations 206b, 208b, 210b shown in FIG. 2B, then the new locations 206b, 208b and 210b are identified in screen-space.

A transformation of the 3D object is determined (360) to minimize the error between the screen-space locations of the object contact points and the screen-space locations of their respective touch points on the display. In other words, the amount of rotation and translation (and, depending on the implementation, scaling) of the 3D object in world-space is determined such that the screen-space locations of the object contact points are as close as possible to the screen-space locations of the touch points, which include at least one touch point that has just been moved to a new location. Any appreciable difference between the screen-space location of the object contact points and the screen-space location of the touch points is deemed an "error" in that the object will appear to have slipped such that the object contact points are no longer displayed directly underneath the touch points. A goal of this operation is to identify a transformation of the 3D object that eliminates this error or minimizes this error to within an acceptable range.

Notably, the set of touch points used for determining the transformation of the 3D object includes only those touch points that are currently placed on the 2D display interface. That is, the 2D display interface device detects whether any touch points have been removed prior to determining the transformation of the 3D object and then determines the transformation of the 3D object based only on the remaining touch points currently placed on the 2D display interface.

The process 300 triggers transformation of the 3D object in response to movement of touch points. Other implementations of the 2D display interface device may additionally trigger the transformation of the 3D object in response to adding or removing touch points or in response to applying a different pressure to one or more existing touch points. Alternatively, the 2D display interface device may continually (or periodically) transform the 3D object at fixed time increments (e.g., every 1 millisecond), irrespective of movement, addition, or removal of touch points or of pressure changes at touch points.

For example, in some implementations, the 2D display device may additionally detect when a touch point has been removed and, if the current orientation of the 3D object corresponds to an error greater than zero (or greater than a predetermined small threshold), the 2D display device may immediately determine a new transformation of the 3D object that uses the remaining touch points to minimize the error and then may transform and visually render the 3D object using the new transformation. in this implementation, the removal of a touch point by the user may appear to cause a 3D object that has slipped to suddenly snap back (or snap closer) to the touch points that remain on the screen.

In some implementations, the 2D display device may additionally trigger transformation of the 3D object in response to detecting that the user has added a touch point and "missed" the 3D object. Upon detecting the user adding such a touch point, the 2D display device may respond to the newly added touch point by immediately transforming 3D object in order to position a predetermined portion of the 3D object underneath the newly added touch point.

In some implementations, the 2D display device may additionally trigger transformation of the 3D object in response to detecting that the user has changed the pressure applied to one or more touch points, even if those touch points have not moved. As described further below in reference to ambiguous rotation situations, application of pressure can set a target depth for the 3D object that can be used by the 2D display interface device when transforming the 3D object. Accordingly, rather than moving touch points across the 2D display interface, the user may instead choose to simply "push" one or more touch points to trigger transformation of the 3D object and watch the displayed 3D object appear to be pushed into the screen away from the user along the camera's Z axis.

In some implementations, a function s(x,q) may be used to represent the screen-space location of a contact point on an object. Specifically, the function s(x,q) defines the screen-space point p corresponding to an object-space point x projected onto the image plane of the camera of the 2D display interface when the object has been transformed in world-space in accordance with a transformation vector q. The function s(x,q) may be expressed as follows:

$$p = s(x,q) = h(PM(q)x)$$

in which P is a projection matrix, and M is a matrix parameterized by the vector q which maps x from object-space into world-space, and h is the viewport transformation. M is typically the product of several matrices which are parameterized by transform values that reflect how the 3D object is moved in world-space (e.g., through rotation, scaling, translation, etc.), and P is a projection matrix which describes the camera's field of view as well as how an object's image size changes with distance to the camera.

Typically, transforming a 3D object from object-space to world-space requires specification of values for six variables—three variables that indicate the translation of the object along the x, y, and z axes and three variables that indicate the rotation of the object about the x, y and z axes. Accordingly, a 3D object able to move freely in world-space has six degrees of freedom (DOFs). When projecting this 3D object onto the image plane of a camera, an additional DOF corresponding to object scaling (i.e., how the object's image size changes with distance from the camera) also may be be considered. Accordingly, a transform of a 3D object from object-space to world-space when considering the projection of the 3D object onto an image plane of a camera may involve seven transform DOFs.

Depending on the choice of the projection matrix P, however, some of these DOFs may be redundant or unnecessary. For example, if P is chosen to be a perspective transformation, scaling the object up may be similar in effect to translating the object so it becomes close to the camera. However, if P is chosen to be an orthographic projection, then translating the object toward or away from the camera may have no effect, perhaps leaving scaling as the sole DOF capable of changing the object's screen-space extent. For these reasons, in some implementations, not all seven transform DOFs (three for rotation, three for translation, and one for scaling) may be required or even useful at all times.

In some implementations, to simplify the transformation calculations, the camera is assumed to be a perspective camera and thus an object's screen-space extent is affected by both translation and scaling. However, in reorganization that, when viewed from a perspective camera, an object translating along the camera's Z axis is visually identical to the scaling of the object, the scaling DOF is removed from the transformation calculations, resulting in the object having only 6 DOFs. Additionally, the projection matrix P is made constant to prevent introduction of any other DOFs arising from movement of the camera. As such, the projection of an object contact point onto the image plane of the camera may only be altered by the object-space to world-space transformation as controlled by the transformation vector q because the location of the camera is kept fixed (i.e., the camera location has no DOFs).

The transform parameters q and object-space to world-space transformation matrix M(q) may be defined as:

$$q = [tx\ ty\ tz\ qx\ qy\ qz]$$

$$M(q) = T(tx, ty, tz)Q(qx, qy, qz)$$

in which T is a conventional translation matrix and Q is a unit-quaternion matrix in which:

$$qw = \sqrt{1 - qx^2 - qy^2 - qz^2}$$

In this implementation, quaternions are used to represent rotations of the 3D object. Quaternions are normally a four DOF quantity, but if the transformation vector q is forced to contain only unit quaternions (e.g., by constraining the value for qw as shown above) then the number of quaternion DOFs can be dropped down to three. Accordingly, in this implementation, identifying a 3D transformation of an object to minimize the error between the screen-space location of the object contact points and the new screen-space location of the touch points requires a determination of six transform parameters (tx, ty, tz, qx, qy and qz) of the vector q.

In some implementations, the 2D display interface device includes a solver that determines the transform parameters of the transformation vector q by minimizing a quadratic energy function that measures the total squared error between the screen-space locations of the touch points (including the newly moved touch points) and the screen-space locations of the corresponding contact points. For example, if s(x,q) is a function that projects object-space point x into screen-space given transformation vector q, and $x_i$ and $p_i$ are the positions of the i-th contact point and i-th touch point, respectively, then the energy (i.e., total squared error) may be given by the following equation:

$$E = \sum_j \|s(x_i, q) - p_i\|^2$$

That is, E is equal to the square of the Euclidean distance between the screen-space location of an object-space contact point $x_i$ and a screen-space location of its corresponding touch point $p_i$ summed up for all i, where is equal to 1 to the total number of touch points place on the screen by the user. Values for the transformation vector q are then sought by the solver that minimize E with respect to q. This minimization may be treated as a nonlinear least-squares minimization problem. A variety of techniques can be used by the solver to solve for the values of the transformation vector q that result in a minimum error between the screen-space locations of the contact points on the 3D object and the screen-space locations of the touch points (one or more of which have been moved to new locations). For example, the solver may use purely gradient-based algorithms. Additionally or alternatively, the solver may use a Quasi-Newton method such as the Broyden-Fletcher-Goldfarb-Shanno (BFGS) method.

In one implementation, the solver uses a Levenberg-Marquardt nonlinear least-squares minimization algorithm (LM) because of the speed at which it can be executed on commodity hardware. For example, by using the LM algorithm, the solver can solve for the transformation vector q in a fraction of a millisecond on a 3 GHz Intel CPU. This speed of calculation enables a conventional personal computer to transform the 3D object in real-time such that movement of the touch points by the user results in a corresponding real-time transformation and display of the 3D object that creates a smooth and realistic illusion of object manipulation by the user.

Using the LM algorithm, however, may require at least as many terms in the energy function E as the DOFs of the object. Since each touch point added two terms to the energy (i.e., an error in the x screen-space coordinate and an error in the y screen-space coordinate), transformations based on three touch points of an unconstrained object should result in a transformation vector q that transforms the object with no error or slippage (i.e., E=0). That is, since the number of DOFs of an unconstrained 3D object is six and the number of terms in the energy function E for the three touch points is also six, the LM algorithm should be able to solve for a transformation vector q that transforms the 3D object such that the screen-space locations of the contact points on the 3D object are equal to the new screen-space locations of the touch points (i.e., E=0).

In contrast, if only one or two touch points have been placed on the screen, then use of the LM algorithm may require locking down some of the DOFs to the transform's current values. For example, if only one touch point is used for the transformation (e.g., only one finger is placed on the 2D display interface and is moved from one location to the other), then 4 DOFs (i.e., 6DOFs-2DOFs) may be fixed at the transform's current values. For example, the values of tz, qx, qy and qz may be fixed to the transform's current values such that movement of the finger only results in the object translating in a plane defined by the x and y axes (i.e., movement of the object is limited to translation in the x and y directions of the camera). If only two touch points are used for the transformation (e.g., only two fingers are placed on the 2D display interface and are moved to different locations), then 2 DOFs (i.e., 6 DOFs-2×2DOFs) may be fixed at the transform's current values. For example, the values qx and qy may be constrained to fix the rotational orientation of the object about the x and y axes such that movement of the two fingers only results in translation of the object in three dimensions and rotation of the object about the z-axis. Notably, by locking down some of the DOFs at the transform's current values, application to the LM algorithm results in a transformation of the object that is entirely consistent with conventional RST-style 2D object transformation for one and two touch point interactions. Moreover, by constraining the DOFs of the object as stated above for one to two touch point interactions, the object can be transformed with no error or slippage (i.e., E=0). That is, the transformation vector q of the object found by the LM algorithm should result in the screen-space locations of the contact points on the 3D object being equal to the new screen-space locations of the touch point.

In some implementations, an interaction with the 2D display interface may be deemed to begin upon placement of one or more touch points on the interface and may end upon the user removing all touch points from the interface. Alternatively, an interaction with the 2D display interface may be deemed to begin upon a user placing a set number of touch points on the screen (e.g., one touch point placed by one finger) and end when the user later changes the number of touch points on the screen (e.g., changes to two touch points placed by two fingers).

When four or more touch points are placed on the 2D display interface, use of an unconstrained energy quadratic in screen-space error may enable the interface to continue to be responsive. However, minimizations which involve a large number of touch points may come at the expense of some slippage. In some implementations, such slippage may be spread out evenly among the touch points.

While the one to two touch points interactions described above involved constraints on the DOFs of the 3D object by fixing the DOFs at their current transform values, in some implementations, other constraints may placed by the interface designer on the DOFs of the 3D object. These other constraints are referred to as penalties and are described further below with respect to FIGS. 14-19.

Referring again to FIG. 3, the 2D display interface device uses the determined transformation to transform the 3D object (370), and visually render the transformed 3D object (380) to make the displayed object contact points substantially underlie the location of their respective touch points on the 2D display interface (including the one or more newly moved touch points). For example, in FIG. 2F, the 2D display interface device rotated the cube 204 to place the screen-space projection of the contact points 220-224 underneath the new screen-space location 206c, 208c, and 210c of touch points 206a, 208a and 210a, respectively.

Notably, If the transformation determined by the solver in operation 350 corresponded to no error or slippage (e.g., E=0 for the transformation vector q found by the solver), then the screen-space locations of the contact points should be identical to that of their respective touch points. That is, a displayed contact point (i.e., the projected contact point) may be exactly underneath its corresponding touch point without even one pixel of deviation. If the transformation determined in operation 350, however, corresponded to some error or slippage (e.g., E>0 for the transformation vector q found by the solver), then the screen-space locations of the contact points will differ from that of their respective touch points. That is, a displayed contact point may not be positioned exactly underneath its corresponding touch point but rather may be separated, for example, by one or more pixels from its corresponding touch point. FIGS. 5A-5E illustrate an example of slippage or error between touch points and their corresponding contact points and are described in more detail below.

Once the object has been transformed and rendered, the determination (310) is made again and the process 300 continues. In one implementation, the 2D display interface device repeats the process 300 every 1 millisecond such that the placement and movement of touch points on the 2D display interface is continually monitored and objects are transformed and rendered by the 2D display interface device virtually immediately in response to touch point changes on the 2D display interface.

The process 300 supports direct manipulation for substantially any number of touch points in both 2D and 3D. In examples in which interactions are based on a single touch point or on two touch points, process 300 provides output that is consistent with that of a standard RST controller for 2D objects by fixing some of the DOFs of the object to the transform's current values. That is, the process 300 outputs the transform values that result in the screen-space projections of the contact points matching the screen-space locations of the touch points after the movement of one or more of the touch points by the user to new locations of the 2D display interface.

With three or more touch points, the process 300 supports direct manipulation into 3D. As is the case with one or two touch points in 2D, the process 300 produces exact solutions in 3D for up to three touch points (i.e, solution with no slippage that have E equal to zero or approximately equal to zero). As described above, for four or more touch points, minimizing the energy equation will find the transform parameters resulting in the substantially best fit to screen-space contact point location. In some implementations, the process 300 may provide a user with a way to easily rotate and translate displayed 3D objects with little training because of the intuitive nature of 3D object direct manipulation.

The process 300 is described above in terms of manipulation of a 3D object as if the 3D object were a discrete unit and in terms of contact points located on the surface of the 3D object. In practice, however, the 2D display interface device that implements process 300 is operating on data sets that represent the 3D object.

For example, when transforming and rendering a 3D object on the 2D display interface, the 2D display interface device may access a 3D object-space data set that represents the 3D object in object-space (e.g., the data set identifies every point in object-space that corresponds to a location on the surface of the object and/or within the object). The 2D display interface device also may access data representing an object transformation vector that specifies the orientation of the 3D object in world-space (i.e., specifies the rotational orientation, location, and, in some implementations, scaling of the object). Using the 3D object-space data and the transformation vector data, the 2D display interface device may calculate a 3D world-space data set that represents the 3D object in world-space (e.g., the data set identifies every point in world-space that corresponds to a location on the surface of the object and/or within the object). The 2D display interface device may determine the 3D world-space data set by, for example, determining an object-space to world-space conversion matrix for the transformation vector and then applying the matrix to the 3D object-space data set. The 2D display interface device may then access data representing an image plane of a camera of the 2D display interface and may then determine a 2D screen-space data set for the object that represents a 3D view of the 3D object by projecting the 3D world-space data set onto the image plane based on the data representing the image plane. The 2D display interface device may then render the 3D view of the 3D object using the 2D screen-space data set.

Figure 4A:
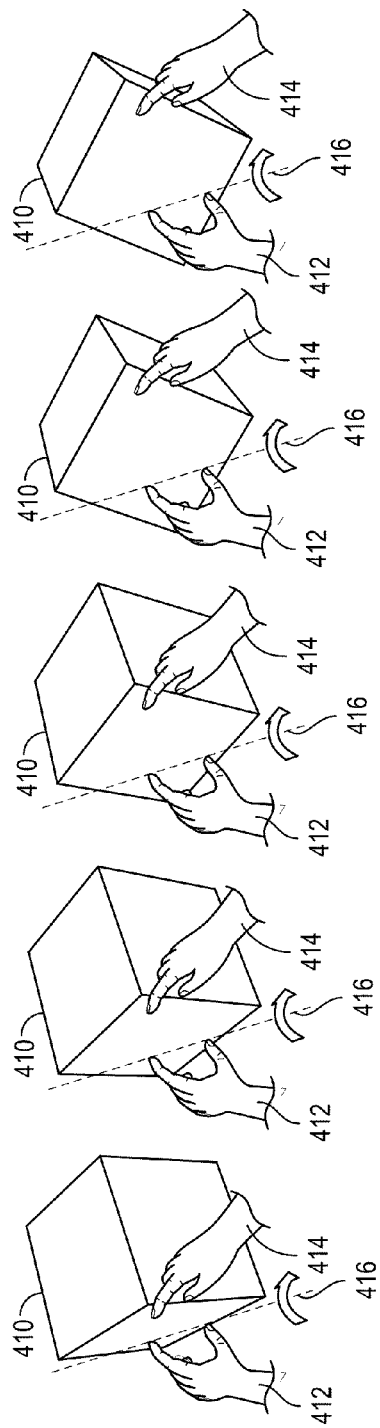
FIGS. 4A-4D are each a sequence of diagrams that illustrate gestures for user manipulation of a 3D object displayed on a 2D display interface.

Referring now to FIGS. 4A, 4B, 4C and 4D, the techniques described herein enable a variety of bimanual (e.g., two-handed) interactions for manipulating displayed 3D objects. Perhaps the most natural of these is a swivel interaction, an example of which is illustrated in FIG. 4A. In this interaction, the user places two (or more) fingers of a hand 412 down on a 3D object 410, which in some implementations may pin the object 410 down at these touch points and defines an axis 416 to swivel around. Then, by moving one finger from the other hand 414 while keeping the fingers of hand 412 fixed, the user can freely swivel the object 410 about.

Figure 4B:
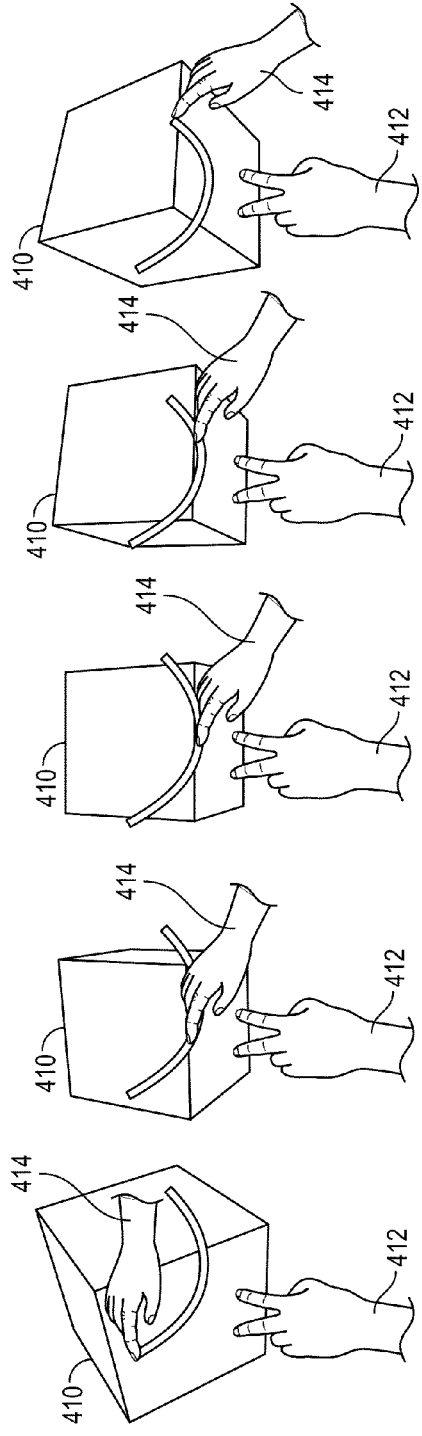

In reality, the fingers of hand 412 pinning the object 410 down do not define a fixed axis. While the user can rotate the object 410 as if there really was an axis defined, the user is also able to manipulate the object 410 in directions parallel to the axis 416. An example of this type of interaction is shown in FIG. 4B. In some implementations, this type of manipulation may not be possible if the axis of rotation were fixed. In comparison, a "handle controller", which defines a fixed axis with one hand and controls the angle of rotation with the other, may be more cumbersome compared to the type of interaction the described techniques permit. In some implementations, the described techniques may be extended to mimic a handle controller or other indirect 3D manipulators by placing penalties to impose screen-space constraints that mimic those imposed by a handle controller. Using penalties to impose screen-space constraints is described further below with respect to FIGS. 14-19.

Figure 4C:
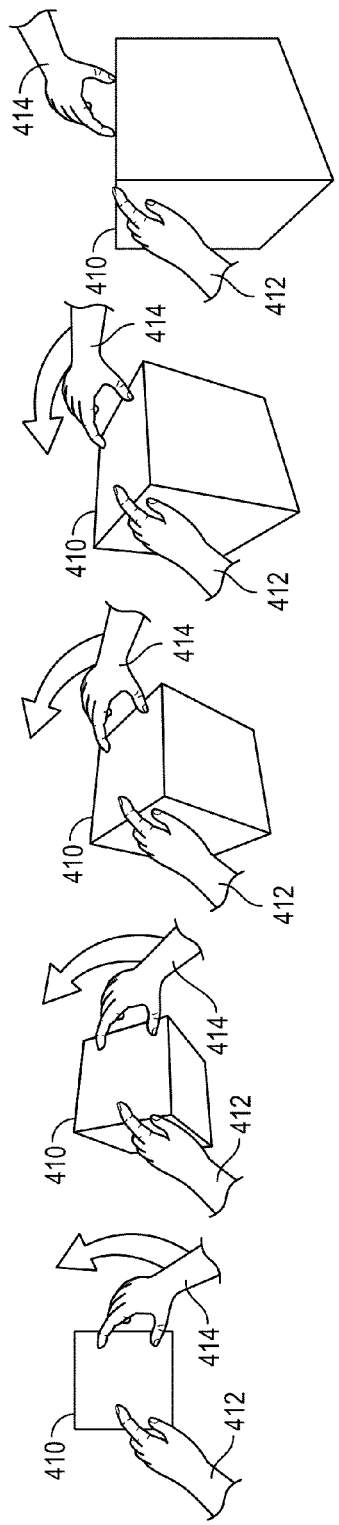

FIG. 4C illustrates another example three-finger interaction, which may be called a "shear rotate". As in the swivel interaction illustrated in FIG. 4A, the user places three fingers on the object 410, two from the hand 414 and one from the other hand 412. The user then rotates the hand 414 that has two fingers down through an angle, in this example, by approximately 90 degrees. As the three points become more collinear, the object 410 rotates either towards or away from the user, depending on the object's 410 orientation at the beginning of the interaction. In either case the result may be that the object 410 will have rotated about 90 degrees about an axis in the camera's X-Y plane, while twisting approximately 45 degrees about a perpendicular axis also in the camera's X-Y plane.

Figure 4D:
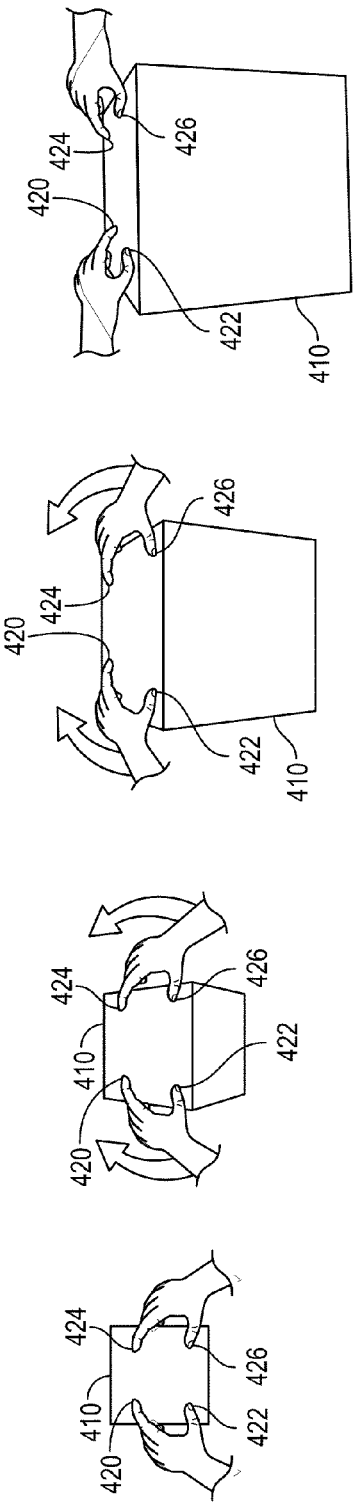

Referring now to FIG. 4D, illustrated is an example interaction which may be referred to as a "perspective rotate". In this interaction, the user begins by placing four fingers at a collection of touch points 420-426 corresponding to contact points on the object 410 in a roughly rectangular configuration. The user then moves the touch points to decreases the distance between two adjacent touch points, such as, for example, shrinking the distance between the touch points 420 and 422 and the touch points 424 and 426, while simultaneously increasing the distance between the other two, such as increasing the distance between the touch points 420 and 424 as well as between the touch points 422 and 426. In response to this gesture, the object 410 may rotate to best achieve the perspective described by the new hand configuration.

FIGS. 5A-5E illustrate an example of an interaction with a displayed 3D object that results in slippage. As stated above, of four or more touch point are place on the 2D display interface, the energy function E may be overconstrained such that the solver attempting to find the 3D object transformation may fail to converge, and the display may become unresponsive (e.g., appear to lock up because the computer is busy trying to resolve a combination of inputs for which no exact solution is achievable). However, by using an unconstrained quadratic minimization, the solver may find an acceptable 3D object transformation that has some error or slippage (i.e., has some deviation in screen-space contact point locations from the new screen-space locations of the corresponding touch points such that E>0) but that distributes the error or slippage among the touch points. In such an implementation, any number of touch points may be placed, even if the total number of input DOFs (which correspond to two input DOFs per touch point in the 2D plane of the 2D display interface) is larger than the number of transform parameters being solved for. Moreover, as described further below with respect to FIGS. 12A, 12B, 12C and 13, the error or slippage can be distributed among the touch points in a non-uniform manner that may, for example, place the majority of the slippage on one or more of the touch points.

Figure 5A:
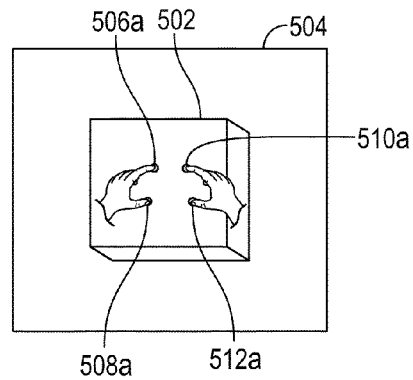
FIGS. 5A-5E are each a sequence of diagrams that illustrate a user manipulation of a 3D object displayed on a 2D display interface that imparts an error, as viewed from a perspective of the user and from an oblique world-space perspective.
Figure 5B:
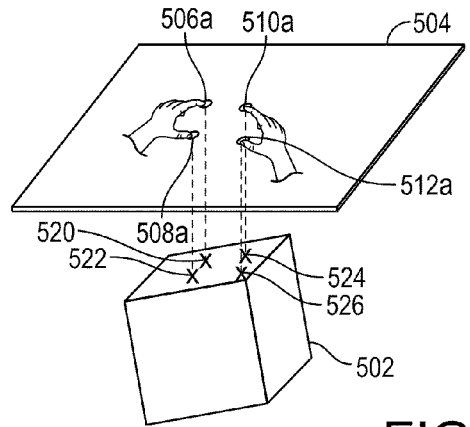

Referring now to the user perspective view of FIG. 5A, a 3D object 502 is displayed on a 2D display interface 504. The user has placed two fingers on one hand at a touch point 506a and a touch point 508a, and has placed two fingers from the other hand at a touch point 510a and a touch point 512a. As can be seen in the oblique world-space view shown in FIG. 5B, the touch points 506a, 508a, 510a and 512a correspond to a collection of contact points 520, 522, 524 and 526 on the object 502.

Figure 5C:
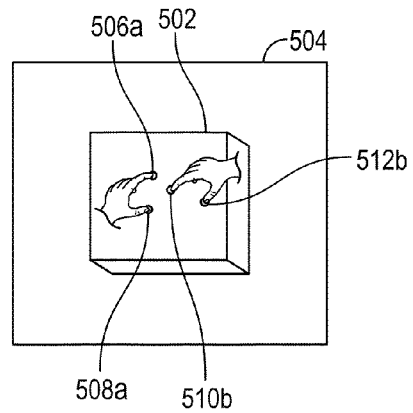
Figure 5D:
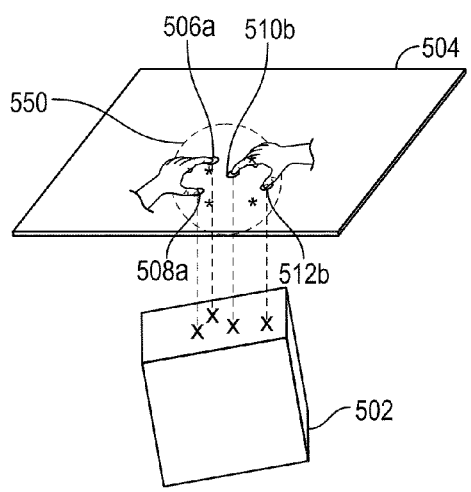

FIGS. 5C and 5D illustrate the user and oblique world-space views of the object 502 and the interface 504 after the user has rotated his/her right hand while keeping the position of his/her left hand fixed. As such, the locations of the touch points 506a and 508a remain substantially unchanged, but the rotated right hand has moved touch points 510a and 512a across the surface of the interface 504 to new locations 510b and 512b, respectively.

Figure 5E:
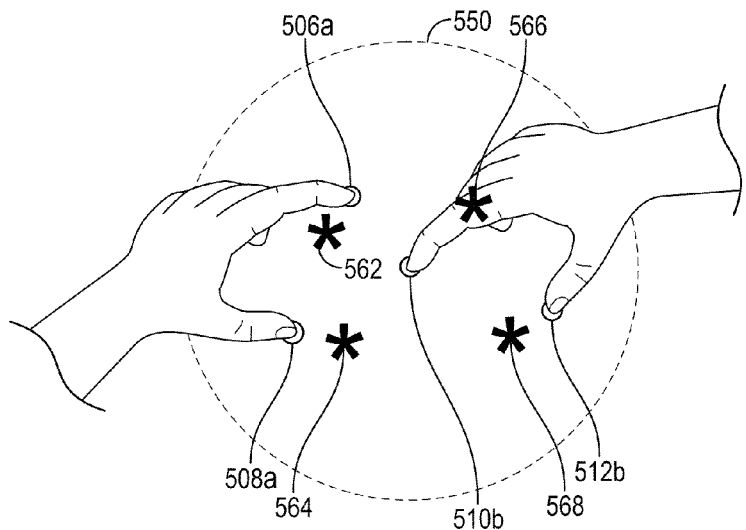

FIG. 5E is an enlarged view of the area identified as 550. As can be seen, the new locations 510b and 512b are offset from the original locations of touch points 510a and 512a, while the locations of touch points 506a and 508a remain substantially unchanged. This illustrates an example of the previously described scenario where the movement of four or more touch points may make an exact minimization (e.g., E=0) impossible. In other words, no combination of transform parameters q exists that would orient the object 502 in world-space in a way that can align the contact points 520, 522, 524 and 526 with the touch points 506a, 508a, 510b, and 512b such that the screen-space locations of each of the contact points 520, 522, 524 and 526 is equal or substantially equal to the screen-space locations of their respective touch points 506a, 508a, 510b and 512b. The discrepancy or deviation between the screen-space locations of the touch points 506a, 508a, 510b, and 512b and the screen-space locations of the contact points 520, 522, 524 and 526 is an example of the aforementioned phenomena of slippage.

As shown in FIG. 5E, a solution for q produced by the energy minimization algorithm (e.g., the LM algorithm) results in the 2D display interface device slightly rotating the object 502 counterclockwise relative to the plane of the interface 504 to substantially evenly distribute the error among the touch points. The touch points 506a, 508a, 510b, and 512b are visible, along with a collection of screen-space projection locations 562, 564, 566 and 568 of the contact points 520, 522, 524 and 526. Notably, in this example, since the object 502 cannot be transformed in such a way as to cause all four of the screen-space locations 562-568 to perfectly align with the screen-space locations 506a, 508a, 510b, and 512b (which may, for example, occur when a solution for the transform parameters q that makes E=0 cannot be found), a solution for q is found that minimizes the error between the screen-space locations 562, 564, 566 and 568 of the contact points 520, 522, 524 and 526 and the new screen-space location of the touch points 506a, 508a, 510b, and 512b (e.g., minimizes the value of E).

User manipulations of simulated 3D objects by using the described 2D display interface device may produce some surprising results that negatively impact the desired illusion that the user is actually manipulating a real 3D object. For example, some user manipulations can lead to surprising results in which the 3D object suddenly rotates about axes other than the camera's Z axis in a manner that was unexpected by the user. Such surprising results may be caused by rotational extrema—i.e., points in the transform space at which screen-space distances are maximized with respect to rotational DOF. These situations may arise frequently during normal use.

Two major classes of surprising results attributable to rotational extrema are identified and techniques for curbing their negative influence are provided. The first class is referred to as ambiguous rotations and is described below in reference to FIGS. 6A, 6B, and 7, and the second class is referred to as rotational exhaustion and is described below in reference to FIGS. 8(i)-8(v), 9(i)-9(v), 10A, 10B and 11.

Figure 6A:
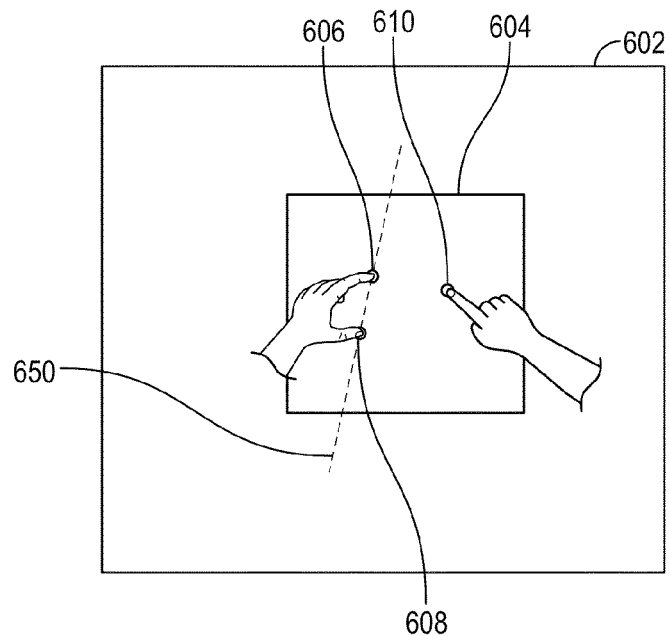
FIGS. 6A-6B are diagrams that illustrate a user manipulation of a 3D object displayed on a 2D display interface that may induce ambiguous rotation, as viewed from a perspective of the user and from an oblique world-space perspective.
Figure 6B:
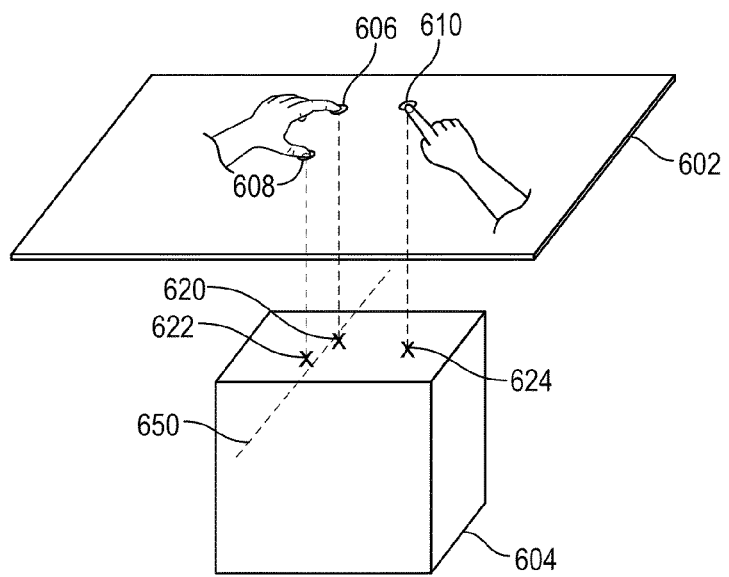
Figure 7:
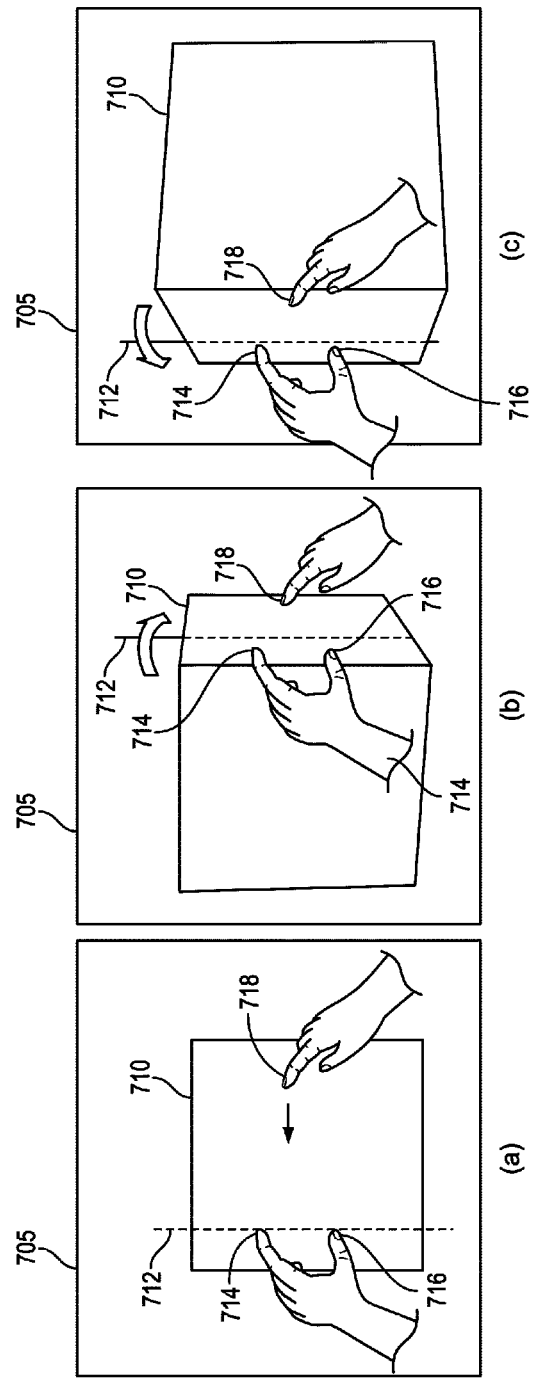
FIG. 7 is a diagram that illustrates a user manipulation of a 3D object displayed on a 2D display interface that leads to ambiguous rotations of the 3D object.

Ambiguous rotation situations occur when three or more touch points applied by the user have corresponding contact points that are located at the same depth along the camera's Z axis and the user then brings the three touch points closer together such that the 3D object will have to rotate about an axis to match the touch points with the contact points. Such a situation is shown in FIGS. 6A and 6B in which the user has applied a collection of three touch points 606, 608, and 610 that correspond to contact points 620, 622, and 624, which are located at approximately the same depth along the camera's Z axis. An ambiguous rotation results, for example, when the user keeps the location of two of the three touch points fixed and then moves the third touch point towards the two fixed touch points. In moving the third touch point towards the two fixed touch points, the user may expect the object to rotate about an axis lying in the X-Y plane of the camera that is defined by the two fixed touch points. The user, however, may be surprised when the 2D display interface shows the object rotating about the expected axis but in a direction opposite to what the user intended (i.e., the object is rotated counter-clockwise about the expected axis rather than clockwise or vice versa).

FIGS. 7(a), 7(b) and 7(c) are diagrams that illustrate an example of an ambiguous rotation of a 3D object 710 displayed on a 2D display interface 705. The initial locations of three touch points 714, 716 and 718 are shown in FIG. 7(a). The three touch points 714, 716 and 718 correspond to contact points on the 3D object 710 located at the same depth along the Z-axis of the camera. The user keeps the locations of the two touch points 714 and 716 fixed on the 2D display interface 705 so that they define an axis of rotation 712. As shown by the arrow in in FIG. 7(a), the user then move the third touch point 718 closer to the axis of rotation 712.

FIG. 7(b) shows a first of two possible displays that may be rendered on the 2D display interface 705 in response to the user moving the third point 718 closer to the axis of rotation 712. As shown in FIG. 7(b), the 2D display interface 705 displays the object 710 rotated away from the user about the axis of rotation 712. Notably, the transformation of the object 710 produced in response to the detected movement of the third touch point 718 exhibits no slippage (i.e., E=0, such that the screen-space location of each contact point is substantially equal to the screen-space location of its corresponding touch point after transformation of the object).

FIG. 7(c) shows a second of the two possible displays that may be rendered on the 2D display interface 705 in response to the user moving the third touch point 718 closer to the axis of rotation 712. As shown in FIG. 7(c), the 2D display interface 705 displays the object 710 rotated towards the user about the axis of rotation 712. Notably, like the transformation of the object 710 shown in FIG. 7(b), the transformation of the object 710 shown in FIG. 7(c) also exhibits no slippage (i.e., E=0, such that the screen-space location of each contact point is substantially equal to the screen-space location of its corresponding touch point after transformation of the object).

Accordingly, as shown in FIGS. 7(b) and 7(c), two equally correct transformation vectors q corresponding to opposite directions of rotation about axis 712 can be found for transforming the object 710 without slippage in response to movement of the third touch point 718 towards the axis of rotation 712. Assuming that a gradient descent-based solver is used (i.e., a solver that uses a gradient descent-based algorithm such as, for example, the LM algorithm), the choice of transformation vector q from among these two possible transformation vectors q may be determined entirely by how the solver chooses descent directions.

However, by intelligently biasing the starting conditions used by the solver when applying the gradient descent-based algorithm to favor one direction over the other, it is possible to choose which of the two possible transformation vectors q will be selected by the solver. Specifically, a situation in which an ambiguous rotation is possible corresponds to a maxima in the solution space of the solver. By applying a small perturbation to the initial values of the solver away from the maxima, a particular descent path in the solution space can be chosen at the start that will arrive at one solution for the transformation vector q over the other. For ambiguous rotations, this may involve selecting the axis of rotation and a direction of rotation about that axis and then using a small displacement in that direction as the starting point for rotational update DOF of the solver (e.g., quaternion values qx, qy and qz).

For example, in the situation presented in FIGS. 7(a), 7(b) and 7(c), the solver can be biased to select the transformation vector q that rotates the object 710 towards the user by initializing transformation parameter qy to a small negative value (such as $-10^{-1}$) instead of zero. The solver will then start by considering solutions for the transformation vector q that include a clockwise rotation of the object 710 about the Y axis.

The biasing of the solver to select one transformation vector q over the other transformation vector q in an ambiguous rotation situation also can be based on a set of rules that take into account user interaction. In one implementation example, the set of rules may indicate that the starting conditions of the solver should be biased to result in a negative rotation about the Y-axis when the movement of the third touch point closer to the two other touch points corresponds to moving the third touch point left on the screen (i.e., on the 2D display interface) and result in a positive rotation about the Y-axis when the movement of the third touch point closer to the two other touch points corresponds to moving the third touch point right on the screen. Similarly, the starting conditions of the solver may additionally or alternatively be biased such that moving the third touch point upwards and downwards on the screen results in a positive and a negative rotation about the X-axis, respectively. The biasing in accordance with these rules may be arrived at by biasing (or perturbing) the starting values of qx and/or qy such that descending the gradient in the solution space from the local maxima corresponding to the ambiguous rotation situation will cause selection of the transformation vector q that corresponds to the desired rotation.

Notably, the biasing or perturbation of the starting conditions used by the solver to mitigate ambiguous rotation situations should not impact the ability of the solver to arrive at a correct energy minimization transformation vector q, even when the solver is not faced with an ambiguous rotation situation. The correct energy minimization transformation vector q corresponds to a local minima in the solution space. The biasing or perturbation of the starting conditions used by the solver to deal with ambiguous rotations will either push the DOF of the object towards or away from the local minima in the solution space. If the initial starting value is perturbed towards the local minima, then the solver will converge to the correct energy minimization vector q as normal. If the initial starting value is perturbed away from the local minima, then, because the starting point is away from the local maxima (i.e., the solver is not faced with an ambiguous rotation situation), and assuming the perturbation is relatively small, the solver should still converge to the correct energy minimization vector q. That is, the solver will descent the gradient from the perturbed point past the original pre-perturbed point and wind up at the same local minima corresponding to the correct energy minimization vector q.

In some implementations, pressure also may be used in addition to or instead of biasing the solver to correct rotational ambiguities. In implementations wherein the 2D display interface is pressure sensitive, the user may vary the pressure applied at the different touch points to influence the transformation of the 3D object. The application of pressure by the user when placing and moving touch points may provide the user with an extra half-dimension (e.g., a non-negative value) that can be used by the 2D display interface device in addition to the usual 2D touch point placement and motion for determining the transformation of the 3D object. The application of pressure by the user, thus, may enable the user to "push" a contact point further into the screen. Rotational ambiguities then may be resolved by pushing one side of the object into the screen when beginning a rotation.

In some implementations, pushing can be accomplished by adding a penalty to the energy equation E which influences the solver into moving a contact point (that corresponds to the touch point at which the pressured was applied) in the desired direction in world-space. The desired depth, $z_{target}$, can be determined from the pressure value applied at the touch point and the corresponding contact point's current world-space depth. For example, if the contact point's current world-space depth is 1200 in world-space units and the pressure applied by the user at the touch point corresponding to the contact point is P, the target world-space depth for the contact point may be 1200 plus P/10. The contact point's deviation from the target depth can then be measured via the quadratic penalty $$80 \; (z_{target} - \langle z, M(q)x \rangle)^2$$

in which x is the contact point in object-space to be pushed, z is the unit-length vector pointing into the screen, and λ is a weighting coefficient used to correct the difference in dimensionally between the world-space penalty and the screen-space energy. The term M(q)x represents the contact point expressed in world-space and is equal to the contact point x in object-space multiplied by the object-space to world-space transformation matrix M(q). The term $\langle z, M(q)x \rangle$ represent the inner product (i.e., the dot product) of the unit-length vector z and the contact point expressed in world-space, which is simply the z coordinate in world-space of the contact point. Accordingly, the penalty applied to the energy equation E is equal to λ times the square of a quantity equal to the difference between $z_{target}$ and the z coordinate in world-space of the contact point x.

The term λ can be viewed as a trade-off factor of how much slippage among the contact points is acceptable for the point pushed into the screen. A more in depth discussion of penalties and possible choices of value for λ is provided below in reference to FIGS. 14-19.

In some implementations, a pressure penalty term is included in the energy equation E for each contact point corresponding to a touch point placed on the screen (i.e., on the 2D display interface). In other implementations, a pressure penalty term is only included in the energy equation E for each of the contact points corresponding to touch points placed on the screen by the user and for which the user has applied a pressure greater than a predetermined threshold value.

As stated previously, another class of surprising results attributable to rotational extrema that occur in response to user manipulation of simulated 3D objects using the described 2D display interface device is rotational exhaustion. Unlike ambiguous rotation situations which arise when three or more touch points are moved closer together, rotational exhaustion situations arise when three or more touch points are moved farther apart.

Figure 8:
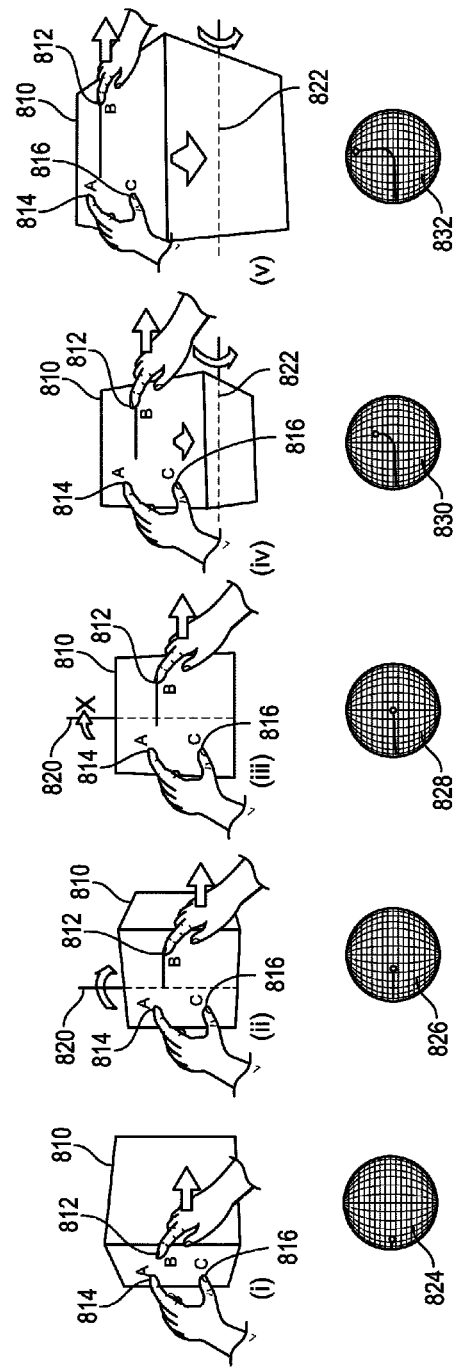
FIGS. 8(i)-8(v) are a sequence of diagrams that illustrate a user manipulation of a 3D object displayed on a 2D display interface that results in a rotational exhaustion situation, as viewed from a perspective of the user.

FIGS. 8(i), 8(ii), 8(iii), 8(iv) and 8(v) are diagrams showing an example of a rotational exhaustion situation. As shown in FIG. 8(i), the user has placed three touch points 812, 814 and 816 on the 2D display interface. The three touch points 812, 814 and 816 have corresponding contact points B, A and C, respectively, such that the 2D display interface creates the illusion that the user is grasping the object 810 at the corresponding contact points. Note that in this example no slippage occurs, and, therefore, the contact points, while labeled A, B and C in FIG. 8, are not separately visible underneath the corresponding touch points 814, 812 and 816.

The user then moves the touch point 812 to the right on the interface while keeping the location of the touch points 814 and 816 fixed. In response to the movement, the 2D display interface device rotates the object 810 about the axis 820 such that the contact points A, B and C on the object 810 remain substantially underneath the touch points as shown in FIG. 8(ii).

The user continues to move the touch point 812 to the right on the 2D display interface while keeping the touch points 814 and 816 fixed until the object 810 has exhausted its rotation about the axis 820, as shown in FIG. 8(iii). Put another way, the user continues to move the touch point 812 to the right on the 2D display interface until the screen-space lengths between the contact point B and the respective contact points A and C are maximized with respect to rotation about the object's current axis, i.e., rotation about axis 820.

When rotation about the current axis (i.e., axis 820) of the object 810 is exhausted, further movement of the touch point 812 to the right on the interface may still result in the solver determining a transformation of the object that corresponds to zero slippage by using other object DOFs to move the object.

However, the sudden shift to using the other object DOFs when matching the touch points with the contact points can result in movement of the 3D object in a surprising and unintuitive manner.

As shown in FIG. 8(*iv*), the continued movement of touch point 812 to the right on the 2D display interface after the rotation about the axis 820 of the object 810 has been exhausted results in the 2D display interface device both translating the object 810 in the Z-axis direction to bring the object 810 closer to the image plane of the camera and rotating the object 810 about a new axis 822 that is perceived to be perpendicular to the axis 820. The rotation about the new axis 822 occurs because of the constraints imposed on the movement of the object 810 by contact points A and C as the object translates in the Z-axis direction to accommodate the continued movement of the touch point 812 to the right on the 2D display interface. Further movement of touch point 812 to the right on the 2D display interface results in the object 810 moving even further towards the image plane of the camera and the object 810 rotating even more about the new axis 822, as shown in FIG. 8(*v*).

Many users of the 2D display interface may find the sudden and abrupt translation of the object 810 toward the camera and the simultaneous sudden and abrupt change in the rotational axis of the object 810 to be inconsistent with the original interaction, which was merely movement of a single touch point (i.e., touch point 812) in a straight line in one direction on the 2D display interface. More generally, users may expect that a smooth and consistent motion of touch points on the 2D display interface should result in an equally smooth and consistent motion of the object similar to that which results from a 4 DOF interaction when manipulating a 2D object. As shown above, however, this property is not satisfied under projected 3D rotation when rotational exhaustion occurs. That is, as an axis of rotation is exhausted, sharp changes in direction in parameter space may occur. These sudden and unexpected changes in movement of the object may be surprising to many users and may cause confusion. As described next, the point at which the rotational exhaustion occurs may be detected and appropriate action may be taken to either control or correct the unexpected shift in interaction behavior.

Some insight into the problem of rotational exhaustion may be gained by fitting a plane to the contact points A, B and C corresponding to touch points 814, 812 and 816 and examining the path the plane's normal takes during a typical interaction exhibiting rotational exhaustion. FIGS. 8(*i*)-8(*v*) include a representation of the position of the normal to the best-fit plane below each respective illustrated position of object 810. The representation of the position of the normal is a fixed hypothetical sphere that encompasses the object 810 and on which is depicted the location that the normal intercepts the surface of the fixed hypothetical sphere as the normal moves with the movement of object 810. Specifically, the path that the normal has taken is depicted on the fixed hypothetical sphere by a line and the current position of the normal is depicted on the fixed hypothetical sphere by a small circle that represents the current location that the normal intercepts the surface of the sphere. Notably, the position of the eye vector of the camera (i.e., the unit vector that points in the camera's Z-axis direction) is represented on the fixed hypothetical sphere as the closest point on the sphere to the reader.

FIG. 8(*i*) shows the sphere 824 depicting the initial position of the normal of the best-fit plane of the contact points A, B and C at the beginning of the movement of object 810 that will lead to rotational exhaustion. Notably, the best fit plane, in this example, is the plane that encompasses the flat side of the object 810 (i.e., the side of the cube) on which is positioned the three contact points A, B and C.

As the touch point 812 is moved by the user to the right on the 2D display interface, the 2D display interface device rotates object 810 about the axis 820 and the normal of the of best-fit plane starts to become more and more parallel with the eye vector of the camera. This is depicted by spheres 826 and 828 of FIGS. 8(*ii*) and 8(*iii*), respectively.

When the user has moved the touch point 812 to the right on the 2D display interface such that the rotation about the axis 820 is exhausted, the 2D display interface device suddenly translates towards the camera and begins rotating the object 810 about a new axis 822. This new rotation causes the normal of the best-fit plane to suddenly take a sharp turn and become less and less parallel with the eye vector of the camera. This sharp turn is depicted by sphere 830 of FIG. 8(*iv*). Continued movement by the user of touch point 812 to the right on the 2D display interface results in the 2D display interface device further translating the object toward the camera and further rotating the object 810 about the new axis 822 such that the normal of the best fit plane continues along its new trajectory, as shown by sphere 832 of FIG. 8(*v*).

Notably, the sharp bend in the path that the normal takes characterizes rotational exhaustion as the axis of rotation quickly changes from one axis to another. While FIGS. 8(*i*)-8(*v*) show the new axis 822 and the initial axis 820 being substantially perpendicular to each other and show the normal of the best-fit plane becoming substantially parallel to the eye vector when rotational exhaustion occurs, such is not always the case. In some rotational exhaustion situations, the new axis may not be perpendicular to the initial axis, and the normal of the best-fit plane may not ever become parallel to the eye vector. Moreover, while the situation illustrated in FIGS. 8(*i*)-8(*v*), depicts both the new axis 822 and the initial axis 820 lying on the X-Y plane, it is important to note that rotational exhaustion can occur from any starting object orientation, rotating about any axis, not only those axes which lie on the X-Y plane.

Despite the different flavors of rotational exhaustion, rotational exhaustion may still be dependably detected by tracking the path the normal of the best-fit plane takes relative to the eye vector of the camera. When the normal of the best-fit plane becomes more and more parallel with the eye vector of the camera, the plane is said to be waxing. When the normal of the best-fit plane becomes less and less parallel with the eye vector of the camera, the plane is said to be waning. Rotational exhaustion may occur at the plane's transition point from waxing to waning. Put differently, rotational exhaustion may occur when the normal of the best-fit plane is maximally parallel to the eye vector and then starts turning away. Notable, the transition point from waxing to waning does not necessarily mean that the normal vector and the eye vector are actually parallel, but rather that, given the constraints set by the contact points, they may not get any more parallel than they are at this point.

The transition point from waxing to waning can be detected by the 2D display interface device by monitoring the angle between the normal of the best-fit plane of the contact points and the eye vector. In some implementations, w(x,q) is defined as a function which measures the angle point x's normal makes with the eye vector at x, given transform parameters q. The function is evaluated at the centroid of the contact points (i.e., $x = x_{centroid}$) using the normal of the best-fit plane. When the function is evaluated over time as the object orientation changes (i.e., as the transform parameters q change over time), a local minimum in the function with respect to time corresponds to the best-fit plane transitioning from waxing to waning and, therefore, may be indicative of a rotational exhaustion situation. In particular, the function w may be expressed as follows:

$$w(x_{centroid}, q) = 1 - \langle M(q) eye_{centroid}, M(q) n_{plane} \rangle$$

where $x_{centroid}$ is equal to the location of the centroid of the contact points in object-space, M(q) is the object-space to world-space transformation matrix, $eye_{centroid}$ is the unit length camera eye vector expressed in object-space at the location of the centroid of the contact points, and $n_{plane}$ is the unit length normal to the best-fit plane. Accordingly, the value of the function w at the centroid of the contact points is equal to one minus the quantity equal to the inner/dot product of the unit-length eye vector in world-space at the centroid (i.e., the vector that points from the centroid to the camera) and the unit length normal to the best-fit plane in world space. The value for w, therefore, may range from 0 (when the camera eye vector and the normal vector are parallel) to 1 (when the camera eye vector and the normal vector are perpendicular to each other). As stated above, local minimums in w correspond to transition points at which the best-fit plane is changing from waxing to waning.

Notably, detecting the transition point at which the best-fit plane changes from waxing to waning may not be sufficient to conclude that the transition point corresponds to a rotational exhaustion situation. For example, as shown in FIGS. 9(i), 9(ii), 9(iii), 9(iv) and 9(v), a local minimum in w may be an indication that the best-fit plane is changing from waxing to waning, but may not indicate the existence of a rotational exhaustion situation.

Figure 9:
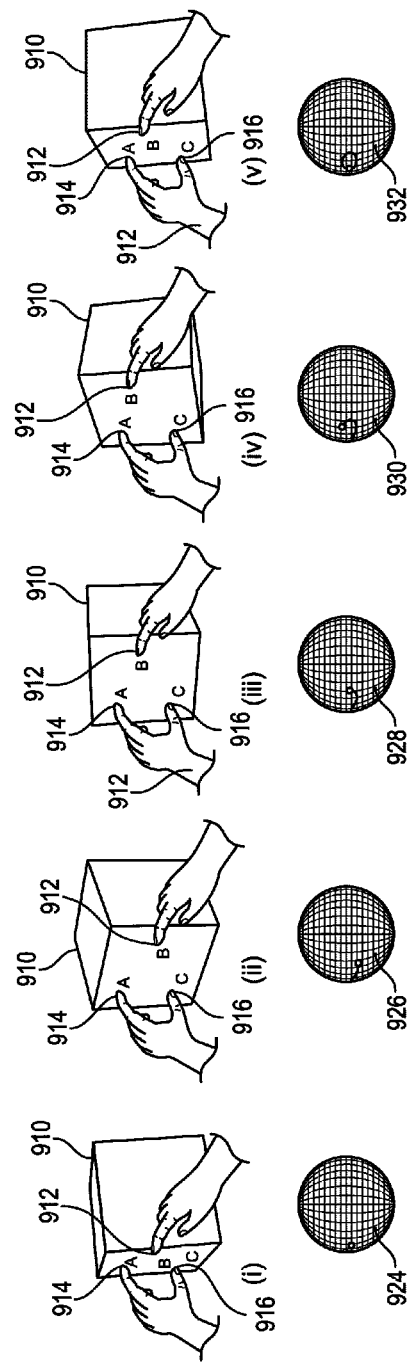
FIGS. 9(i)-9(v) are a sequence of diagrams that illustrate a user manipulation of a 3D object displayed on a 2D display interface that does not result in a rotational exhaustion situation, as viewed from a perspective of the user.

Specifically, as shown in FIG. 9(i), a user has placed three touch points 912, 914 and 916 corresponding to three contact points B, A and C, respectively, on the 2D display interface. The user then begins to move the touch point 912 in a small orbit, moving first to the right and downwards, as shown in FIG. 9(ii), and then starts to return the touch point 912 back towards the touch points 914 and 916, as shown in FIGS. 9(iii) and 9(iv). The user returns the touch point 912 to a location close to its starting location to complete the small orbit, as shown in FIG. 9(v). The theoretical spheres 924, 926, 928, 930 and 932 track the movement of the normal to the best-fit plane in a similar manner as described previously with respect to FIGS. 8(i)-8(v). As shown in FIG. 9(iii), the point at which the touch point 912 begins its return back towards the touch points 914 and 916 corresponds to a local minimum in w. That is, as shown by sphere 928 of FIG. 9(iii) as compared to sphere 926 of FIG. 9(ii) and sphere 930 of FIG. 9(iv), the normal to the best-fit plane of the contact points A, B and C has become at this point as parallel to the camera eye vector (i.e., the unit length vector along the camera's Z-axis that is located at the closest point of the sphere to the reader) as it will ever be in this interaction. Notably, however, while this interaction does result in a local minimum in w, it does not correspond to a rotational exhaustion situation in that no rotation about an axis has been exhausted that would lead to an unexpected and abrupt change in object orientation.

Given that a detection of a local minimum in w may not correspond to a detection of a rotational exhaustion situation, the 2D display interface device may have to capture additional information about the movement of the touch points to distinguish rotational exhaustion situations from other situations that result in a local minimum in w. That is, rotational exhaustion situations may be distinguished from these other situations in that rotational exhaustion situations occur when the touch point or touch points are moved along a relatively consistent trajectory while, in contrast, the other situations occur when the touch point or touch points are moved along a trajectory that is generally inconsistent. For example, in the interaction shown in FIGS. 8(i)-8(v), the user moved the touch point 812 along an approximately straight line path across the 2D display interface from its initial location to the point at which w reached a local minimum and rotational exhaustion occurred. In contrast, in the interaction shown in FIGS. 9(i)-9(v), the user moved the touch point 912 from its initial location to the point at which w reached a local minimum along a path that significantly deviated from a straight line and no rotational exhaustion occurred. Therefore, when detecting rotational exhaustion situations, the 2D display device may not only detect when the function w reaches a local minimum but also may detect whether the movement of the touch point(s) that triggered the local minimum was along a path that does not deviate significantly from a straight line. For example, in some applications, a deviation that is equal to or greater than ten or fifteen degrees from a straight line path of a touch point may be considered sufficient to conclude that the local minimum in w is not indicative of rotational exhaustion.

In detecting rotational exhaustion situations, the 2D display device may further require that the change in w from the touch point's initial position to the touch point's current position be greater than a predetermined minimum threshold. In some applications, the predetermined minimum threshold may be, for example, 0.25. This requirement that the change is w surpasses a predetermined minimum threshold helps protect against false positives. Specifically, by requiring that the change in w surpasses a predetermined minimum threshold, a rotational exhaustion situation will be detected only if the movement of the touch point causes the object to rotate by more than a minimum amount. Depending on the application, this additional protection against false positives may be important because if a minima in w is detected but the total change of w is small, then this likely indicates that the interaction started near a minima and thus may not qualify as a true rotational exhaustion. Stated differently, an interaction that starts near a minima in w may not qualify as a true rotational exhaustion because a true rotational exhaustion results in a behavior of the object that is both abrupt and surprising to the user in response to their interaction with the 2D display interface. When a user starts rotating an object near the minima, however, the user most likely intends to rotate the object through the minima, and, thus, the behavior of the object as it rotates through the minima is less abrupt and likely expected by the user and, therefore, not surprising to the user. In contrast, when the user starts rotating the object far away from the minima in w, which has a rapid shift in rotational behavior near the minima, the shift in behavior when the user moves the object through the minima is likely not intended by the user and, therefore, may appear abrupt and surprising to the user. Accordingly, whether a situation qualifies as rotational exhaustion may depend on an inference of the intent of the user by the 2D display interface device. In this particular case, the 2D display interface device makes this inference based on the amount of change in w.

Figure 10A:
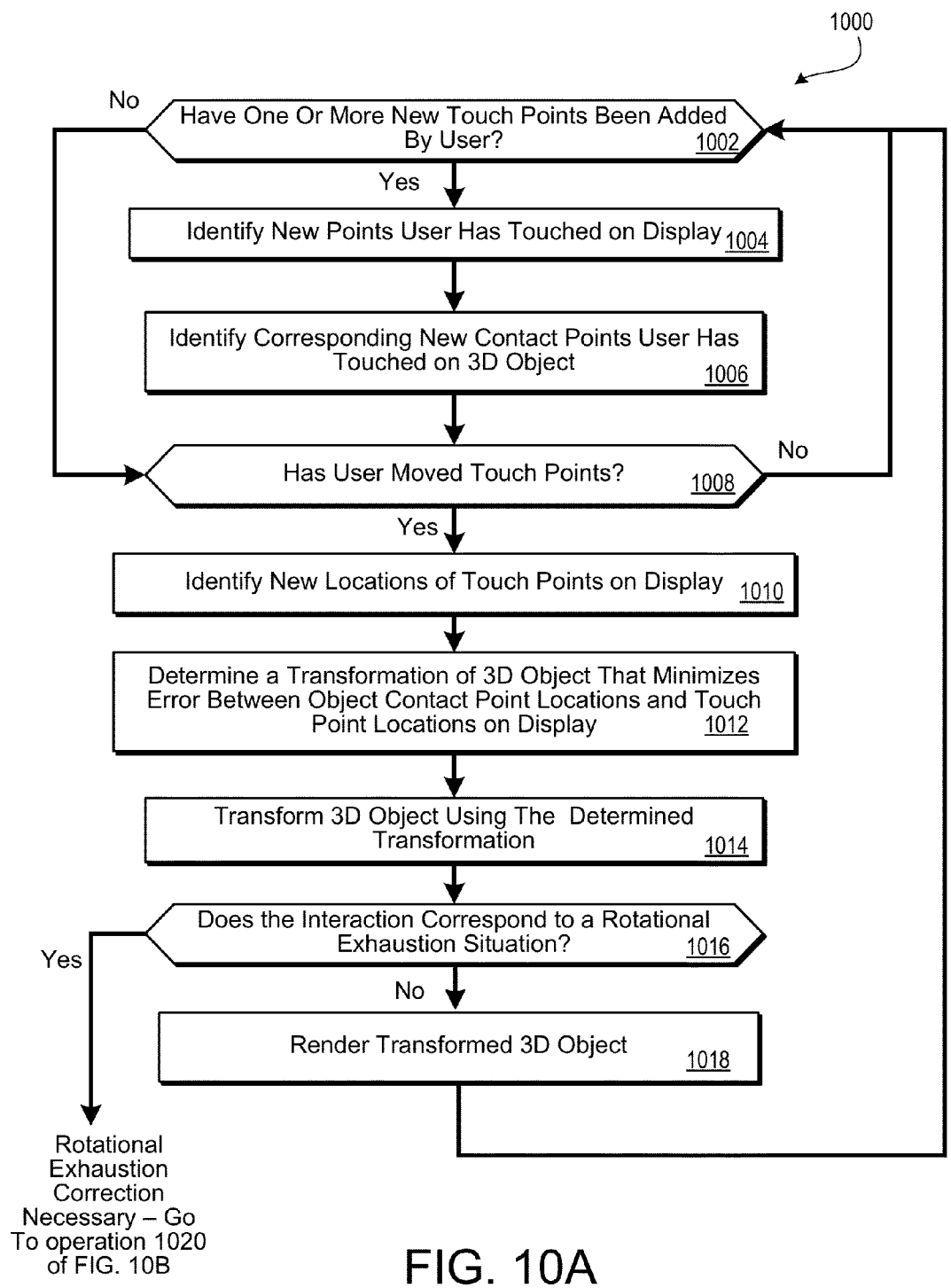
FIGS. 10A and 10B are a flow diagram of a process for enabling a user to manipulate 3D objects through a 2D display interface that includes detection and correction of rotational exhaustion situations.
Figure 10B:
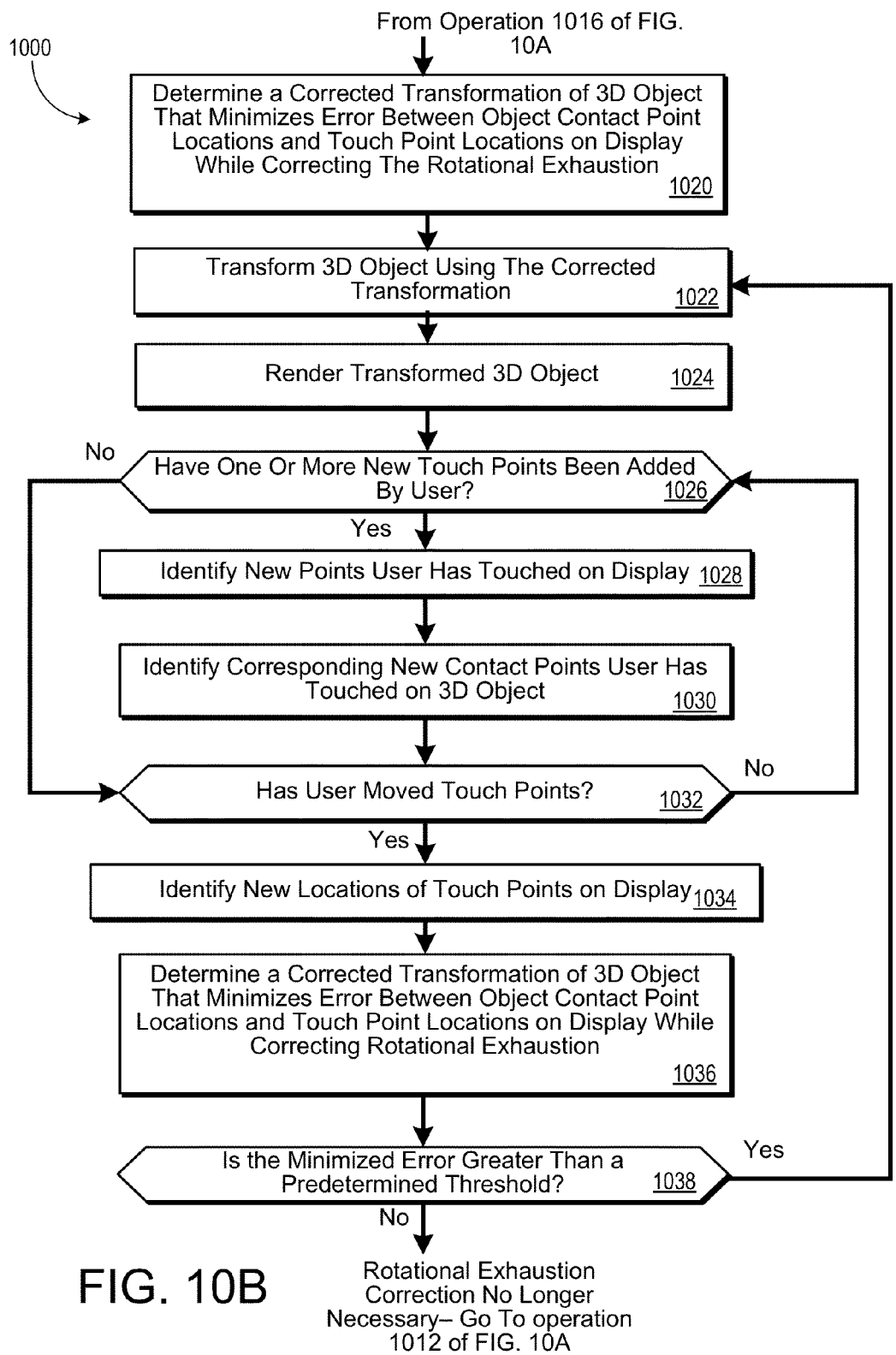

FIGS. 10A and 10B are a flow diagram of an example process 1000 for moving simulated 3D objects in response to one or more inputs on a substantially 2D display interface that "corrects" for rotational exhaustion (i.e., that suppresses the surprising and unexpected behavior that is caused by rotational exhaustion and that may confuse users). The process 1000 may be implemented by a 2D display interface device such as, for example, a multi-touch display device.

Operations 1002, 1004, 1006, 1008 and 1010 of process 1000 may be performed, for example, in the same manner described previously with respect to operations 310, 330, 340, 320 and 350, respectively, of process 300. After having identified the new location of the touch points on the 2D display interface, the 2D display interface device determines a transformation (1012) of the 3D object that minimizes the slippage or error between the screen-space locations of the touch points and the screen-space locations of their corresponding contact points. Notably, because rotational exhaustion is an artifact of 3D object manipulation and not 2D object manipulation, the transformation determined by the solver of the 2D display interface device in operation 1012 assumes that the object can move in 3 dimensions (i.e., 6DOFs) In one implementation, the 2D display interface device includes a solver that uses a least-squares minimization algorithm, such as, for example, the LM algorithm, to find a transformation vector q that minimizes the energy equation E in the same manner as described previously with respect to operation 360 of process 300. The transformation vector q found by the 2D display interface device may then be used to transform the 3D object (1014). The 2D display interface device determines whether the interaction (i.e., the placing of the touch points and the subsequent movement of one or more of the placed touch points) corresponds to a rotational exhaustion situation (1016).

Figure 11:
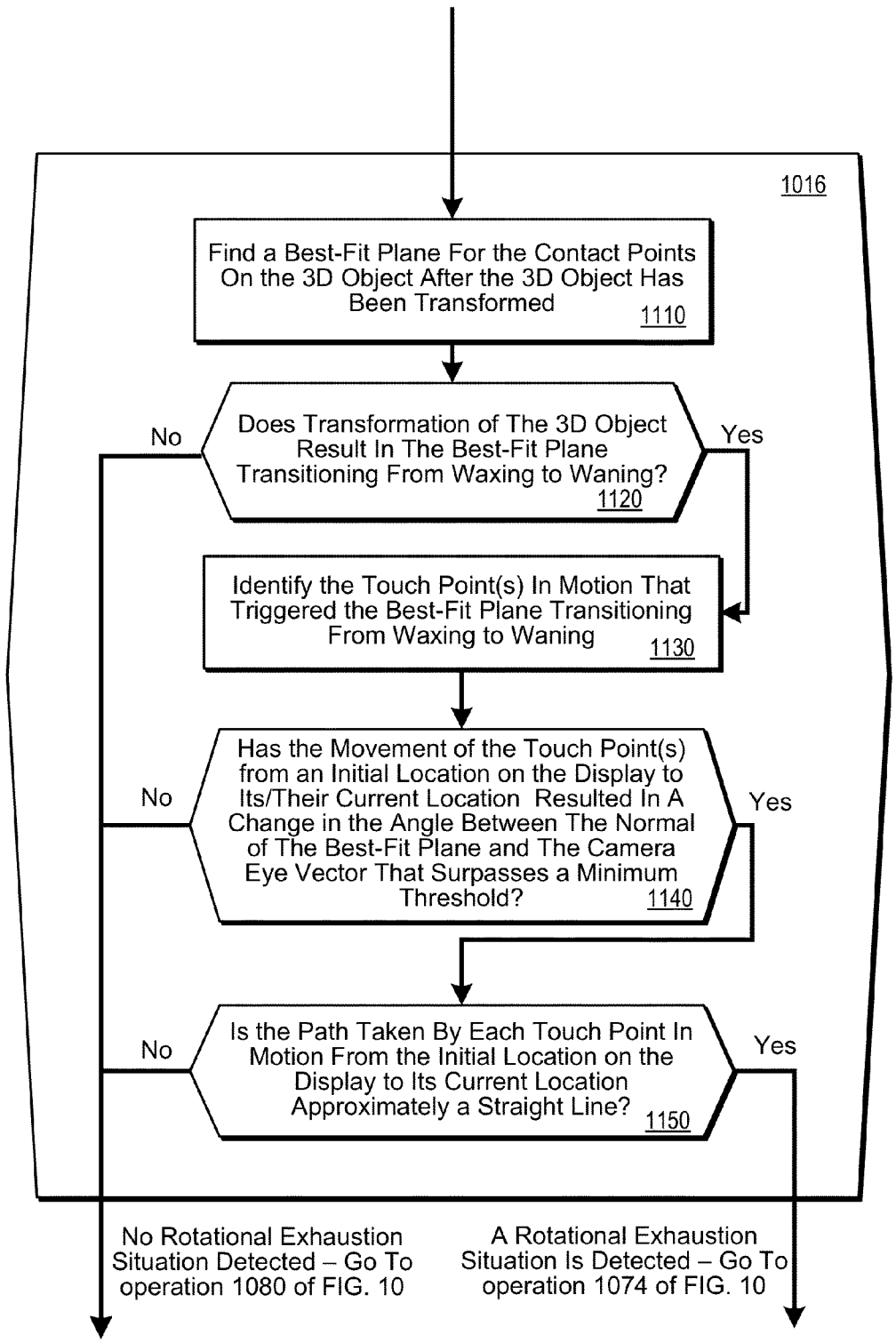
FIG. 11 is a flow diagram of a process for detecting a rotational exhaustion situation.

FIG. 11 is a flow diagram illustrating an example implementation of operation 1016 of process 1000 that may be performed by the 2D display interface device to detect rotational exhaustion situations. The 2D display interface device finds a best-fit plane for the contact point of the 3D object after the 3D object has been transformed (e.g., transformed using the transformation vector q) (1110).

The 2D display interface device determines whether the transformation of the 3D object results in th best-fit plane transitioning from waxing to waning (1120). In one implementation, the 2D display interface device makes this determination by determining whether the function w has reached a local minimum in time. If the function w has not reached a local minimum in time, then the best-fit plane is not transitioning from waxing to waning, and, consequently, rotational exhaustion is not detected. The 2D display interface device, therefore, renders the transformed 3D object on the 2D display interface for viewing by the user (1018). If, however, the function w has reached a local minimum in time, then the best-fit plane is transitioning from waxing to waning, and, consequently, rotational exhaustion may be occurring.

Given the possibility that rotational exhaustion may be occurring, the 2D display interface device identifies the touch point or touch points in motion that caused the best-fit plane to transition from waxing to waning (1130). The 2D display interface device determines whether the movement of the identified touch point or touch points from their initial screen-space locations to their current screen-space locations resulted in a change in the angle between the normal of the best-fit plane and the camera eye vector that surpasses a minimum threshold (1140). In one implementation, this determination may be accomplished by calculating the difference between a first value for w that corresponds to the orientation of the object when the touch point were at their initial screen-space locations and a second value for w that corresponds to the orientation of the object when the touch points are located at their current screen-space locations. The initial screen-space location of a touch point may be, for example, the screen-space location of the touch point when the touch point was first placed on the 2D display interface by the user. Additionally or alternatively, the initial screen-space location of a touch point may be the screen-space location of the touch point at a predetermined time prior to the movement of the touch point that led to the potential rotational exhaustion situation (e.g., 5 seconds prior).

If the change in the angle does not surpass the minimum threshold, then rotational exhaustion is not detected, and the 2D display interface device, therefore, renders the transformed 3D object on the 2D display interface for viewing by the user (1018). If, however, the change in the angle surpasses the minimum threshold, then rotational exhaustion may be occurring, and, therefore, the 2D display interface device may determine whether the trajectory or path taken by each identified touch point from their initial screen-space location to their current screen-space location deviates significantly from a straight line (1150).

If the trajectory or path of at least one of the identified touch points deviates significantly from a straight line, then rotational exhaustion is not detected, and the 2D display interface device, therefore, renders the transformed 3D object on the 2D display interface for viewing by the user (1018). If, however, the trajectory of each of the identified touch points does not deviate significantly from a straight line and, therefore, represents a consistent and smooth movement, then the 2D display interface device concludes that rotational exhaustion is occurring and, therefore, may determine a new transformation of the object that corrects the undesirable object movement caused by the rotational exhaustion (1020).

In some implementations of process 1100, the order of operations 1120-1150 may be changed. For example, operation 1150 may be performed by the 2D display interface device before operation 1160.

Referring back to FIGS. 10A and 10B, if rotational exhaustion is detected, the 2D display interface device may determine a corrected transformation of the 3D object that corrects the rotational exhaustion while minimizing the error between the screen-space locations of the touch points and the screen-space locations of the contact points (1020). In one implementation, the 2D display interface device calculates a corrected transformation vector q by using the same solver that was used calculate the transformation vector q for operation 1012. However, when determining the corrected transformation vector q, the solver now limits the DOFs that the minimization algorithm can operate upon. That is, rather than allowing the minimization algorithm to operate upon all 6 DOFs for finding the transformation vector q, as was done in operation 1012, the solver will now force the minimization algorithm to operate on less than 6 DOFs. The limitation of DOFs result in the solver calculating a corrected transformation vector q that prevents the object from translating or rotating in the abrupt and unexpected manner that arises from rotational exhaustion.

Given that rotational exhaustion occurs from exhausting rotational DOF, it may seem natural to constrain all rotational DOFs of the object (i.e., constrain object rotation about the x, y and z axes) to their current values in order to correct the rotational exhaustion problem. Such a constraint results in the rotation of the object stopping before unexpected behavior occurs. For example, the solver, when applying the least-squares minimization algorithm to calculate the corrected transformation vector q, may fix qx, qy and qz to their current transformation values (i.e., to the values corresponding to the orientation of the object immediately prior to the touch point movement that triggered the rotational exhaustion) such that they may not be varied by the solver when calculating the vector q that results in the minimum error. However, in practice, such a constraint also causes the movement of the object being controlled to be limited to translation and thus the interaction may feel "stiff" to the user, as if the object is sliding on a track.

As described previously with respect to FIGS. 8(*i*)-8(*v*), the unexpected and sudden movement of the object when an axis of rotation has been exhausted involves not only a change in the axis of rotation but also involves a translation along the Z-axis of the camera. This translation works hand-in-hand with the new rotation in order for the touch points and the contact points to be matched. Therefore, another way to correct the rotational exhaustion problem is to restrict translation along the Z-axis of the camera to its current transformation value. Such a constraint also results in the rotation of the object stopping before unexpected behavior occurs. For example, the solver, when applying the least-squares minimization algorithm to calculate the corrected transformation vector q, may fix tz to its current transformation value (i.e., to the value corresponding to the depth of the object along the Z-axis immediately prior to the touch point movement that triggered the rotational exhaustion) such that tz may not be varied by the solver when calculating the vector q that results in the minimum error. In practice, constraining movement of the object along the Z-axis may provide a more natural feel to the user than restricting the rotational DOFs. For example, the object may appear to the user as being suspended in space rather than stuck on a track.

After the corrected transformation is found, the 2D display interface device transforms the object using the corrected transformation (e.g., the corrected transformation vector q) (1022) and renders the transformed object (1024). The 2D display interface device then performs operations 1026, 1028, 1030, 1032 and 1034 to continue monitoring for and responding to the placement and movement of touch points in a manner that may be identical to that described previously with respect to operations 310, 330, 340, 320 and 350, respectively, of process 300.

When one or more touch points have been moved by the user such that another transformation of the object is triggered, the 2D display interface device may identify the new locations of the touch points on the 2D display interface (1034) and may continue to determine a corrected transformation of the object (i.e., a transformation of the object that uses less than all 6 DOFs) to suppress rotational exhaustion (1036). However, eventually the user may move the touch points such that rotational exhaustion is no longer a problem. The 2D display interface device is able to detect when this occurs by determining whether the minimized error/energy E that results from the corrected transformation has fallen beneath a predetermined threshold (1038). The predetermined threshold may vary by application and depends on a decision made by the application designer regarding when a deviation between the contact points and the touch points has been reduced to the extent that it is deemed "close enough" to the nonslippage (i.e., 6 DOF) positions that rotational exhaustion is no longer considered a problem. Since energy measures a deviation in pixels, the application designer may, for example, specify or input into the 2D display interface device a number of pixels in deviation per contact point that is considered close enough to the nonslippage contact point positions that rotational exhaustion is no longer considered a problem for the interaction. The 2D display interface device then may calculate the predetermined threshold from the specified deviation. For example, if a deviation of five pixel per contact point is considered close enough to the nonslippage position and three touch points are currently placed on the 2D display interface, the 2D display interface device may calculate the predetermined threshold to be $3 \times 5^2$ 32 75 units of energy.

Notably, the minimized error/energy must fall beneath the predetermined threshold, not just be beneath the predetermined threshold, for all 6 DOFs to be re-enabled. This distinction is significant because the conditions to re-enable all 6 DOFs is not simply that the energy is below a predetermined threshold but rather that the energy is below the predetermined threshold AND decreasing. The decreasing aspect is important because, when initially disabling DOFs for correcting the rotational exhaustion situation, the energy will become very low (i.e., close to zero) and may, in fact, be below the predetermined threshold. However, as the interaction continues, the energy will increase rather than decrease (i.e., the interaction will be incurring more and more error or slippage), and, therefore, the energy will not satisfy the condition that it fall beneath the predetermined threshold. Only after the energy is increased above the predetermined threshold, and the user then brings the object "close enough" to its original pre-slippage configuration does the energy decrease below (i.e., fall beneath) the predetermined threshold and trigger all 6 DOFs of the object to be re-enabled.

If the minimized error/energy E exceeds the predetermined threshold, then rotational exhaustion is deemed by the 2D display interface device to still be a problem and the object is transformed using the corrected transformation (1022) and rendered (1024). If the minimized error/energy E falls below the predetermined threshold, the 2D display interface device concludes that rotational exhaustion is no longer a problem and a new transformation of the object is determined using all 6 DOFs (1012). The object is then transformed using the new transformation (1014) and rendered (1018). In another implementation, the 2D display interface device may detect that the rotational exhaustion is no longer a problem by detecting when the touch points are moved back close to their pre-slippage positions by the user rather than by comparing the energy/error to a threshold value.

The process 1000 is similar to the process 300 in that it triggers transformation of the 3D object in response to movement of touch points. Other implementations of the 2D display interface device may additionally trigger the transformation of the 3D object in response to adding or removing touch points or in response to applying a different pressure to one or more existing touch points. Alternatively, the 2D display interface device may continually (or periodically) transform the 3D object at fixed time increments (e.g., every 1 millisecond), irrespective of movement, addition, or removal of touch points or of pressure changes at touch points.

As described previously with respect to FIGS. 5A-5E, the solver of the 2D display interface device may not always be able to determine a transformation of the 3D object that results in no error or slippage (e.g., E=0). For example, when using the LM algorithm, the number of terms in the energy function (i.e., the number of input DOFs) may have to be equal to or greater than the number of DOFs of the object. If the number of terms in the energy function is greater than the number of DOFs of the object, then slippage or error occurs. That is, the minimum error/energy transformation vector q found by the solver will correspond to E>0.

As described previously with respect to operation 360 of process 300, each touch point introduces two terms into the energy function (i.e., energy or error in x and energy or error in y). Therefore, for any interaction that involves four or more touch points, the energy function will be overconstrained and slippage will occur. That is, the energy function will have eight or more terms, which is greater than the maximum number of DOFs (i.e., six) available to a 3D object moving freely in world-space. Similarly, if the 2D display interface device reduces the number of DOFs of the object, then the energy function E may be overconstrained and slippage may occur even when responding to three touch point interactions.

For example, if translation of the object along the Z axis is prevented, then the object will only have five DOFs, which is less than the six terms introduced into the energy function by the three touch points.

The energy function introduced previously with respect to operation 360 of process 300 is shown again below:

$$E = \sum_j \|s(x_i, q) - p_i\|^2$$

Since error is measured by this energy function in $L^2$ (i.e., in the square of the Euclidean distances), the error tends to be distributed relatively evenly among the touch points. In other words, the Euclidean distance from the screen-space location of a contact point to the screen-space location of its matching touch point is about the same for each contact point/touch point pair.

FIGS. 12A, 12B and 12C are diagrams illustrating displays presented to a user by a 2D display interface that show slippage between touch points and their corresponding contact points. Referring to FIG. 12A, a user previously placed touch points 1210, 1212 and 1214 onto a displayed cube 1200, and the touch points were previously matched by the 2D display interface device with contact points 1216, 1218 and 1220 on the cube 1200. The user then kept the location of the touch points 1210 and 1212 fixed while moving the touch point 1214 in a rightward direction away from the fixed touch points 1210 and 1212 to the position shown in FIG. 12A. In this example, the application executed by the 2D display interface device prevents the cube 1200 from translating along the Z-axis of the camera, and, therefore, the movement of the touch point 1214 has resulted in slippage between the touch points and their respective contact points. As shown in FIG. 12A, the slippage or error has been distributed evenly among the touch points such that no contact point is displayed on the 2D display interface at the same location as its corresponding or matched touch point. FIG. 12A may, for example, correspond to an error distribution among the touch points that would arise when minimizing the energy function introduced previously with respect to operation 360 of process 300.

In some applications, however, a uniform distribution of the error among the touch points may not be desirable. By adding a normalized weighting coefficients to each contact point's terms in the energy function, the distribution of the error among the touch points can be controlled. This additional coefficient may be indicative of how "important" a particular touch point is relative to the other touch points and, thus, may indicate the degree to which that touch point will be matched during the optimization process (i.e., during the energy or error minimization process performed by the solver of the 2D display interface device). If $\omega_i$ is the weight of the ith touch point, then the new energy equation with weighting coefficients included becomes:

$$E = \sum_j \omega_i \|s(x_i, q) - p_i\|^2$$

$$\sum_i \omega_i = 1$$

The 2D display interface device may use various different schemes to define the weights of the touch points. The choice of the scheme typically depends on the application that is being executed by the 2D display interface device. In some implementations, the 2D display interface device uses a scheme that dynamically assigns weights to touch points while the user is interacting with the 2D display interface based on some measureable property of the interaction.

For example, in some implementations, the 2D display interface device may assign the appropriate weighting coefficients to touch points based on the screen-space distance a touch point has travelled from its initial position to its current position on the 2D display interface. Screen-space distances may be well-suited for being used to assign touch point weighting coefficients because a touch point's motion may be viewed as an indication of the user's intent. If a touch point is moved quite a bit by the user while the other touch points remain relatively fixed, then the touch point in motion may be considered more important than the others, and thus should be matched to its corresponding contact point more closely. If weighting is defined in this manner, then when translating along camera Z is disabled, the object may translate to follow the dominant hand's fingers (i.e., touch points) across the screen while the non-dominant hand's fingers (i.e., touch points) exert little influence on the object's motion.

FIG. 12B illustrates a display of touch points that have been weighted using this weighting scheme. The touch points 1210, 1212 and 1214 shown in FIG. 12B have been moved exactly as described previously with respect to FIG. 12A but now the locations of their corresponding contact points 1216, 1218 and 1220 have changed. Specifically, because the touch point 1214 moved while the touch points 1210 and 1212 remained fixed, the screen-space location of contact point 1220 is now almost identical to that of its matched touch point 1214 (i.e., almost none of the error is distributed to touch point 1214) while the screen-space locations of contact points 1216 and 1218 are now even further away from their matched touch points 1210 and 1212 (i.e., almost the whole error is distributed among touch points 1210 and 1212). Using such a weighting scheme, for example, the 2D display interface device may assign a weight of $w_i$ to a touch point that is equal to some value that is directly proportional to the distance traveled by the touch point. In the scenario shown in FIG. 12B, the 2D display interface device may, for example, have assigned a weight $w_1$ equal to 0.98 to the two energy terms corresponding to touch point 1214, a weight $w_2$ equal to 0.01 to the two energy terms corresponding to touch point 1210, and a weight $w_3$ equal to 0.01 to the two energy terms corresponding to touch point 1212.

In other implementations, the 2D display interface device may define weights such that stationary touch points are more important than touch points in motion. As a result, for an object unable to translate along the Z-axis, the stationary touch points pin the object down while the touch points in motion exert only a small rotational influence on the pinned object. Thus, this weighting scheme maintains the object's position and orientation at the time the slippage occurred.

FIG. 12C illustrates a display of touch points that have been weighted using this weighting scheme. The touch points 1210, 1212 and 1214 shown in FIG. 12C have been moved exactly as described previously with respect to FIG. 12A but not the locations of their corresponding contact points 1216, 1218 and 1220 have changed. Specifically, because the touch points 1210 and 1212 remained stationary while the touch point 1214 moved, the screen-space location of contact points 1216 and 1218 are now almost identical to that of their matched touch points 1210 and 1212, respectively (i.e., almost none of the error if distributed to touch points 1210 and 1212) while the screen-space location of contact point 1220 is now even further away from its matched touch point 1214 (i.e., almost the whole error is distributed to touch point 1214). Using such a weighting scheme, for example, the 2D display interface device may assign a weight of $w_i$ to a touch point that is equal to some value that is inversely proportional to the distance traveled by the touch point. Additionally or alternatively, the 2D display interface device may assign to every touch point that is stationary a first predetermined fixed weight and to every touch point that is in motion a second predetermined fixed weight that is much smaller than the first predetermined fixed weight. Notable, the first and second predetermined fixed weights are typically normalized by the 2D display interface device prior to being used in the energy equation E. In the scenario shown in FIG. 12C, the 2D display interface device may, for example, have assigned a weight $w_1$ equal to 0.02 to the two energy terms corresponding to the touch point 1214, a weight $w_2$ equal to 0.49 to the two energy terms corresponding to touch point 1210, and a weight $w_3$ equal to 0.49 to the two energy terms corresponding to touch point 1212.

In some implementations, when applying the above-described weighting techniques, the 2D display interface device may calculate the distance a touch point has traveled from an initial location to its current location by defining the initial location to be the location of the touch point when it was first placed on the 2D display interface by the user. Additionally or alternatively, the 2D display interface device may calculate the distance by defining the initial location to be the location of the touch point a predetermined time prior to the time at which the distance calculation is performed.

In some implementations, the 2D display interface device may calculate the distance a touch point has traveled from an initial location to its current location as the 2D Euclidean straight line distance between the two locations. In other implementations, the 2D display interface device may calculate the distance a touch point has traveled from an initial location to its current location as an arc length that represents the total distance the touch point actually traveled between the two locations.

When weighting using arc length, important points may be "remembered" because the 2D display interface device may maintain a record of all motion of touch points throughout the interaction. As such, once a touch point becomes important, it may remain important. Consequently, a moving touch point may continue to be weighted highly by the 2D display interface device even when it returns close to its original location because the total distance it traveled on its path during the interaction way very long relative to that of the other touch points. Notably, even when the touch point is moved back to the location where slippage was originally triggered, the touch point may be the only one to have any effect on the object being controlled due to the heavy weight assigned to it by the long path distance that it traveled. Additionally, if one touch point moves much more than the other touch points (such that its arc length or path length is very long) and then slows to a rest while the other touch points start to move, it may take some time before the newly moving touch points are able to exert any influence at all on the object's orientation.

In some implementations, pressure also may be used to control the spread of error among the touch points. By defining a touch point's weight in terms of how hard a user is pressing against the screen, the 2D display interface device may provide the user with a tool that enables the user to pin touch points down. The harder a user presses at a touch point relative to how he/she presses at other touch points, the less error will be allocated to that touch point by the solver. In other words, the harder a user presses at a touch point relative to how he/she presses at other touch points, the closer the screen-space location of the matching contact point will be to the screen-space location of the touch point after the object is transformed by the 2D display interface device. Because pressure values may be continuous and adjustable, touch points may be re-weighted dynamically on the fly. Using such a weighting scheme, for example, the 2D display interface device may assign a weight of $w_i$ equal to some value that is directly proportional to the relative pressure applied at the touch point. The relative pressure for a given touch point may be, for example, a percentage value that represents the currently applied pressure at the touch point as a percentage of the average pressure currently being applied by the user at all of the touch points or, alternatively, as a percentage of the minimum pressure of all the pressures currently being applied by the user at the touch points.

Using pressure values at touch points to control error distribution, however, may become problematic for 2D display interface devices that require the user to use his/her fingers to place and move touch points on the 2D display interface by physically pressing a surface of the 2D display interface. Specifically, when a user presses his/her finger hard against a touch-screen and moves the finger at the same time, friction may cause the interaction to be unpleasant to the user and thus undesirable. Therefore, in some implementations, pressure values are used to control error distribution by making touch points sticky rather than by more heavily weighting touch points that are in motion. In these implementations, for example, the 2D display interface device may assign a first predetermined fixed weight (or a weight that varies directly with applied relative pressure) to every touch point that is both stationary and at which the relative pressure applied by the user is greater than a predetermined threshold, and may assign to every other touch point a second predetermined fixed weight that is much smaller than the first predetermined weight (or much smaller than the minimum weight assigned to a stationary touch point at which a relative applied pressure exceeds the predetermined threshold). Notably, the first and second predetermined fixed weights are typically normalized by the 2D display interface device prior to being used in the energy equation E.

In some implementations, multiple weighing schemes are concurrently used. For example, the 2D display interface device may assign the weighting coefficients to touch points based on the screen-space distance a touch point has travelled from its initial position to its current position on the 2D display interface and, for fixed touch points, based on the relative pressure applied.

Figure 13:
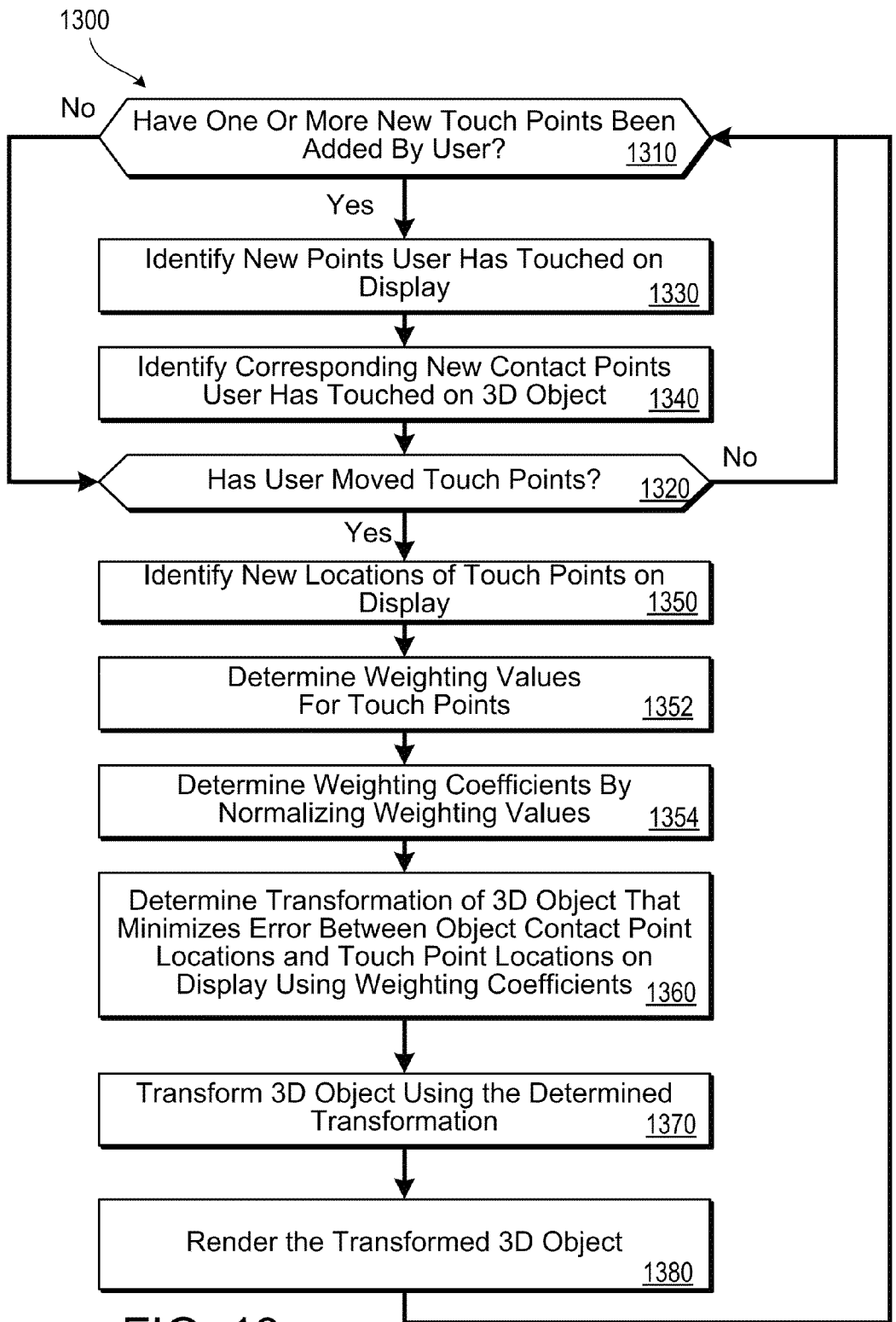
FIG. 13 is a flow diagram of a process for enabling a user to manipulate 3D objects through a 2D display interface that distributes error among touch points in a controlled manner.

FIG. 13 is a flow diagram of an example process 1300 for moving simulated 3D objects in response to one or more inputs on a substantially 2D display interface that distributes slippage errors among touch points in a controlled manner. The process 1300 may be implemented by a 2D display interface device and as, for example, a multi-touch display device.

Operations 1310, 1320, 1330, 1340 and 1350 of process 1300 may be performed, for example, in the same manner described previously with respect to operations 310, 320, 330, 340 and 350, respectively, of process 300. After having identified the new locations of the touch points on the 2D display interface, the 2D display interface device determines weighting values for the touch points (1352). The 2D display interface device may determine the weighting values based on characteristics of the touch points such as, for example, the distance traveled by the touch point from an initial location, whether the touch point is stationary or moving, and/or the pressure applied by the user at the touch point. The 2D display interface device may, for example, use any of the weighting schemes described previously, either alone or in combination with other weighting schemes, to determine the appropriate weighting value for each touch point.

The 2D display interface device normalizes the weighting values to determine weighting coefficients (1354) and then determines a transformation of the 3D object that minimizes the slippage or error between the screen-space locations of the touch points and the screen-space locations of their corresponding contact points using the weighting coefficients (1360). Operation 1360 may be performed, for example, in the same manner as described previously with respect to operation 360 of process 300 with the exception that the terms of the energy function that is being minimized now include the weighting coefficients to distribute the error or slippage among the different touch points. In some implementations, the 2D display interface device applies and algorithm to minimize the previously described energy function E with weighting coefficients. The 2D display interface device then transforms the 3D object using the determined transformation (1370) and renders the transformed 3D object for display on the 2D display interface (1380).

Depending on the application of the 2D display interface device, it may be desirable to constrain an object's motion to meet task-specific ends. Constraints on an object's motion have been described previously with respect to operation 360 of process 300 and with respect to solving ambiguous rotation and rotational exhaustion situations. Up to now, the described constraints on the movement of the 3D object have been limited to reducing the DOFs of the object (e.g., in order to provide exact solutions for one and two point interactions) and adding an additional penalty term to the energy equation that further constrains the 3D object's movement by requiring that the 3D object, after transformation, have a depth value for one or more contact points set by the pressure applied by the user at the corresponding touch points. This latter constraint was referred to as a penalty and is distinct from the former constraint in that the DOFs of the object upon which the solver operates to determine a minimum energy/error transformation vector q are not reduced by the penalty (i.e., the object still has 6 DOFs, assuming no other application-specific DOF reductions have been applied).

A penalty or a penalty function is a function that measures deviation from some ideal condition. The penalty function previously introduced with respect to solving ambiguous rotations, for example, measured deviation of the z coordinate of a contact point from a $z_{target}$ set by the user through application of a pressure at the touch point corresponding to the contact point. In another example, a penalty function may be used in an application that allows a globe to be spun by a user by enforcing the condition that the globe's center always stays at the same location in world-space. In such an application, the penalty function may measure the distance of the globe from the globe's original center and may penalize (i.e., highly increase the energy of the energy function) any object transformations that the solver attempts to apply, when testing different object transformations for minimizing energy, that correspond to the globe moving from the globe's original center.

A 2D display interface device that uses penalties to constrain the movement of a 3D object and that allows control of the distribution of slippage among the different touch points may, for example, use the following energy equation:

$$E = \sum_j \omega_i \|s(x_i, q) - p_i\|^2 + \sum_j \lambda_j g_j(q)^2$$

where $g_j(q)$ is the $j^{th}$ penalty function with a weight coefficient $\lambda$. Penalty functions may not be true, hard constraints of the object's motion in the strictest sense (unlike, for example, reductions in object DOFs), but, through a careful choice of penalty terms, it may be possible to achieve substantially the same results.

As stated previously, the solver of the 2D display interface device may not always be able to determine a transformation of the 3D object that results in no error or slippage (e.g., E=0) when the number of terms in the energy function (i.e., the number of input DOFs) is greater than the number of DOFs of the object. Adding penalty terms to the energy function, therefore, may result in sacrificing the exactness of the solution found by the solver. For example, for three touch point interactions, the addition of even one penalty term to the energy function can result in slippage (i.e., the energy function will have seven terms while the DOFs of the object is six). However, for one touch point interactions, up to four penalty terms may be added to the energy function without resulting in any error or slippage. Notably, if less than four penalty terms are added, then the number of DOFs of the object may have to be reduced to a number equal to the sum of two plus the number of added penalty terms in order to allow the solver to arrive at an exact solution with no error or slippage (i.e., E=0). For two touch point interactions, up to two penalty terms may be added to the energy function without resulting in any error or slippage. However, if only one penalty term is added, then the number of DOFs of the object may have to be reduced to five in order to allow the solver to arrive at an exact solution.

Accordingly, the addition of five or more penalty terms for one touch point interactions, three or more penalty terms for two touch point interactions, and one or more penalty terms for three touch point interactions may result in slippage between the screen-space location of at least one of the touch points and the screen-space projection of its corresponding contact point. While a limit may not be imposed on the number of penalty terms added to the energy function for a given application, the presence of a large number of penalty terms may cause the interaction to noticeably degrade. That is, the presence of a large number of penalty terms may cause significant slippage or error such that the desired illusion that the user is actually "gripping" the 3D object is significantly compromised.

When energy is overconstrained (i.e., when the number of terms in our energy function exceeds the number of available DOF), properly weighting the penalty functions may be required to ensure that each penalty continues to function sufficiently as a constraint. Choosing a value for $\lambda$ to weight a screen-space penalty may serve to inform the solver of the trade-off that the application designer finds acceptable between violating the penalty and the amount of contact point slippage that will be allowed. For example, if screen-space locations are measured by number of pixels, a violation or slippage of one pixel against the ideal condition of the penalty is equivalent to $\lambda$ pixels of slippage of an unweighted contact point. In other words, violating the ideal condition of the penalty by one pixel corresponds to introducing the same amount of error as deviating the screen-space location of an unweighted contact point by $\lambda$ pixels away from the screen-space location of its matching touch point. Therefore, the larger that the application designer makes the value of $\lambda$, the harder the solver of the 2D display interface device will work to ensure that the penalty only receives an equivalently small amount of the error. In implementations that use the energy function described previously, which corresponds to a quadratic function in contact point slippage, the application designer may, for example, set the value of λ to be in the range of 10 to $10^4$ to keep penalty violations small and slippage to a minimum.

The application designer may find that choosing a value for λ to weight a world-space penalty is more difficult and challenging than choosing a value for λ to weight a screen-space penalty. This difficulty arises from the fact that the energy function is expressed in terms of screen-space, and, therefore, deviations from an ideal condition in world-space may first have to be projected into screen-space in order to determine the extent of their corresponding screen-space deviation or error. Therefore, due to this difference in dimensionality, small violations of penalties in world-space are potentially much more disastrous than small violations of penalties in screen-space. For example, a violation of one pixel in screen-space may be barely noticeable, but a violation of the same magnitude in world-space may be glaring. If an application can only tolerate a violation of $10^{-k}$ in world-space of a given penalty before violations become noticeable to the user, the application designer should set a value for λ for this penalty to be at least $10^{2k}$. By setting the value for λ to be $10^{2k}$, violating the ideal condition of the world-space penalty such that the violation just becomes noticeable to the user introduces the same amount of error as deviating the screen-space location of an unweighted contact point by one pixel away from the screen-space location of its matching touch point. The application designer, however, may want the penalty to be more strictly enforced such that violation of the penalty carries more significance than slippage among the contact points. Therefore, the application designer may instead choose to set the value for λ for the world-space penalty to be even higher than $10^{2k}$, such as, for example, $10^{2k+1}$ to $10^{2k+4}$. To illustrate, if the application designer sets the value for λ to be $10^{2k+4}$, violating the ideal condition of the world-space penalty such that the violation just becomes noticeable to the user introduces the same amount of error as deviating the screen-space location of an unweighted contact point by 10,000 pixels away from the screen-space location of its matching touch point.

In setting the value for λ to weight penalties, the application designer may have to be careful to not choose a value for λ that is too large (e.g., greater than $10^6$ to $10^8$). If a penalty is overweighted, the solver of the 2D display interface device may not be able to converge to a solution because, for example, as it chooses different paths to take in the solution space, it may find that any movement at all may result in penalty values that dwarf the error associated with contact point slippage. As a result, the solver may be unable to proceed to a solution, and, as a consequence, the 3D object displayed on the 2D display interface may stop responding.

An application designer may use the 2D display interface device to concurrently or separately impose a variety of different types of penalties on the motion of an object. For example, the application designer may define a point "a" in object-space and require that the location of the screen-space projection of the point "a" be fixed. In some implementations, the application designer may incorporate this penalty into the application executed by the 2D display interface device by adding the following penalty term to the energy function:

$$g(q)=|b-s(a,q)|$$

where be is the fixed screen-space projection of the object-space point "a," which may be calculated, for example, at the beginning of the interaction, and s(a,q) is the screen-space projection of object-space point "a" after the object-space has been transformed in accordance with the transformation vector q during the interaction (e.g., by movement of the object resulting from, for example, movement of touch points by the user). Accordingly, in this example, the penalty function is equal to the Euclidean distance between the fixed screen-space projection of the object-space point "a" (i.e., b) and the screen-space projection of the object space point "a" after the object-space has been transformed in accordance with the transformation vector q.

In another example, the application designer may define a point "a" in object-space and require that the world-space location of point "a" be fixed. In some implementations, the application designer may incorporate this penalty into the application executed by the 2D display interface device by adding the following penalty term to the energy function:

$$g(q)=|b-M(q)a|$$

where b is the fixed world-space location of the object-space point "a," which may be calculated, for example, at the beginning of the interaction, and M(q)a is the world-space location of object-space point "a" after the object-space has been transformed in accordance with the transformation vector q during the interaction. Accordingly, in this example, the penalty function is equal to the Euclidean distance between the fixed world-space location of the object-space point "a" (i.e., b) and the world-space location of the object-space point "a" after the object-space has been transformed in accordance with the transformation vector q.

The application designer may additionally or alternatively place a constraint on object motion that requires that the screen-space distance between points "a" and "b" on the object remains constant. In some implementations, the application designer may incorporate this penalty into the application executed by the 2D display interface device bye adding the following penalty term to the energy function:

$$g(q)=(|s(a,q)-s(b,q)|-d)$$

where d is the fixed screen-space distance between points "a" and "b," which may be calculated, for example, at the beginning of the interaction, and s(a,q) and s(b,q) are the screen-space projections of points "a" and "b" on the object, respectively, after the object has been transformed in accordance with the transformation vector q during the interaction. Accordingly, in this example, the penalty function is equal to the difference between the fixed screen-space distance between points "a" and "b" (i.e., b) and the screen-space distance (i.e., the 2D Euclidean distance) between the screen-space projection of object point "a" and the screen-space projection of object point "b" after the object has been transformed in accordance with the transformation vector q.

The application designer may additionally or alternatively place a constraint on object motion that requires that the world-space distance between points "a" and "b" on the object remains constant. In some implementations, the application designer may incorporate this penalty into the application executed by the 2D display interface device by adding the following penalty term to the energy function:

$$g(q)=(|M(q)a-M(q)b|-d)$$

where d is the fixed world-space distance between points "a" and "b," which may be calculated, for example, at the beginning of the interaction, and M(q)a and M(q)b are the world-space positions of points "a" and "b" on the object, respectively, after the object has been transformed in accordance with the transformation vector q during the interaction.

Accordingly, in this example, the penalty function is equal to the difference between the fixed world-space distance between points "a" and "b" (i.e., d) and the world-space distance (i.e., the 3D Euclidean distance) between the world-space location of object point "a" and the world-space location of object point "b" after the object has been transformed in accordance with the transformation vector q.

The application designer may additionally or alternatively place a constraint on object motion that restricts the rotation of the object about an axis "v" in world-space. In some implemenations, the application designer may incorporate this penalty into the application executed by the 2D display interface device by adding the following penalty term to the energy function:

$$g(q)=<v,M(q)w>$$

where v is the axis in world-space, which may be selected, for example, at the beginning of the interaction, w is the same selected axis in object-space, M(q) is (as defined previously) the object-space to world-space transformation matrix, and the < > indicate an inner or dot product. Accordingly, in this example, the penalty function is equal to the dot product of the fixed axis in world-space with the same axis in object-space after the object has been transformed in accordance with the transformation vector q during the interaction. As is evident from this penalty function, minimization of the penalty requires that the solver maintain the axis w in object-space as parallel as possible with the fixed axis v in world-space.

The application designer may additionally or alternatively place a constraint on object motion that requires that the world-space location of object point "a" be restricted to a plane. In some implementations, the application designer may incorporate this penalty into the application executed by the 2D display interface device by adding the following penalty term to the energy function:

$$g(q)=<n,M(q)a>$$

where n is the normal to the selected plane in world-space, which may be determined from a plane selected, for example, at the beginning of the interaction, M(q) is the object-space to world-space transformation matrix, a is the location of the point "a" in object-space, and the < > indicate an inner or dot product. Accordingly, in this example, the penalty function is equal to the dot product of the normal to the selected plane in world-space with the world-space location of the point "a."

Notable, when adding the penalty terms described above to the energy function, the terms are typically squared and multiplied by λ. Accordingly, the contribution of these penalties to the energy or error is equal to the square of the deviation from their ideal condition weighted by λ.

As illustrated by the aforementioned examples, many different types of penalties can be added to the energy function to achieve various types of restrictions on the object's movement. In general, an application designer has a lot of flexibility to design virtually any kind of restriction to object motion by leveraging the ability of the disclosed techniques to transform parameters from object-space to world-space and to screen-space. Given this flexibility, an application designer can impose restrictions using, for example, distance measurements and dot products in any of the three different spaces (i.e., screen-space, world-space and object-space). Once such penalties are implemented, rich interactions may be created with just a few lines of code.

Figure 14:
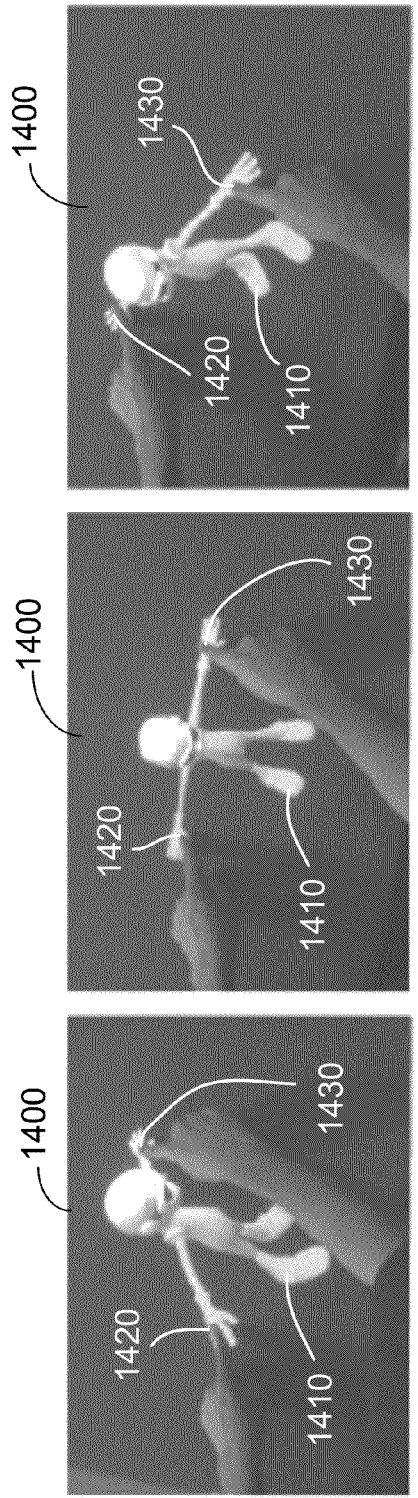
FIG. 14 is a sequence of diagrams that illustrate a user manipulation of a 3D object displayed on a 2D display interface where the motion of the 3D object is restricted by a penalty, as viewed from a perspective of the user.

For example, FIG. 14 is a sequence of diagrams that depict a two touch point interaction in which a penalty has been added to the energy function that only allows rotation of the object 1410 about the first touch point 1420 placed by the user on the 2D display interface 1400. In this case, the user placed another touch point 1430 after having placed the first touch point 1420. Notably, in this interaction, the rotation of the object 1410 is about a normal to the plane tangential to the surface of the object 1410 at the location of the first touch point 1420. This type of penalty enables two touch point rotation about arbitrary 3D axes since the axis is determined dynamically based on the first touch point that is placed on the 2D display interface by the user.

In some implementations, multiple penalties can be used in tandem to produce more interesting interactions than a single penalty might allow along. For example, penalizing a point's deviation from a plane alone may not stop the rest of an object from orienting itself in some arbitrary manner with respect to the plane. By additionally penalizing the rotation of the point's normal and tangent vectors, the object may be forced to slide along the plane without any twisting.

Figure 15:
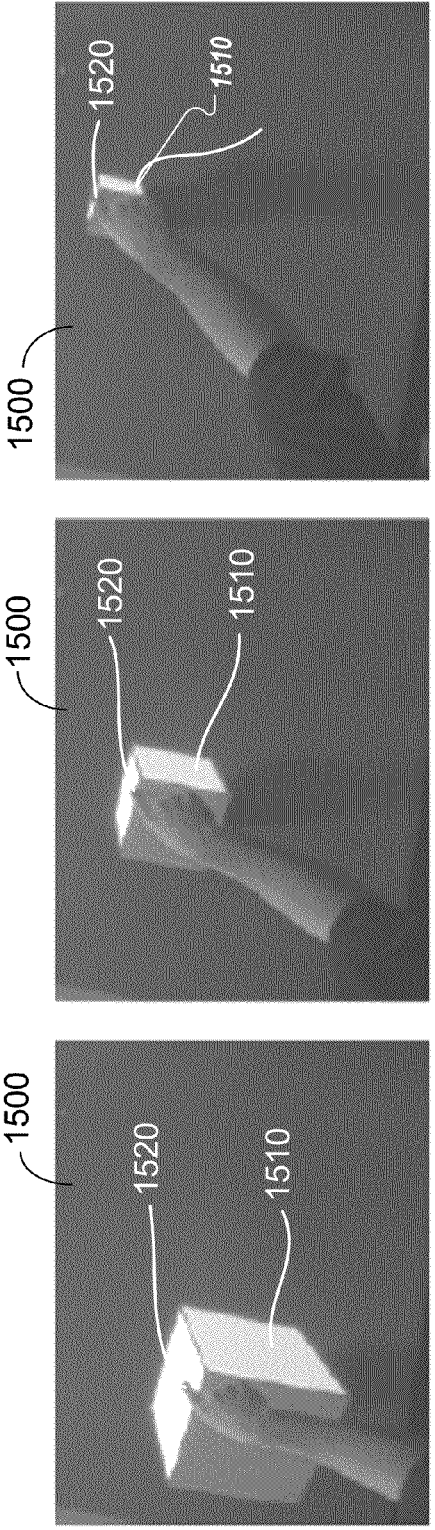
FIG. 15 is a sequence of diagrams that illustrate a user manipulation of a 3D object displayed on a 2D display interface where the motion of the 3D object is restricted by multiple penalties, as viewed from a perspective of the user.

FIG. 15 is a sequence of diagrams that illustrate an example of a single point interaction in which a cube 1510 is constrained to move in a plane perpendicular to the normal of a single touch point 1520 placed on a 2D display interface 1500, where twisting is not allowed. Notably, the plane perpendicular to the normal is the plane tangential to the surface of the cube 1510 at the location of the touch point 1520.

Figure 16:
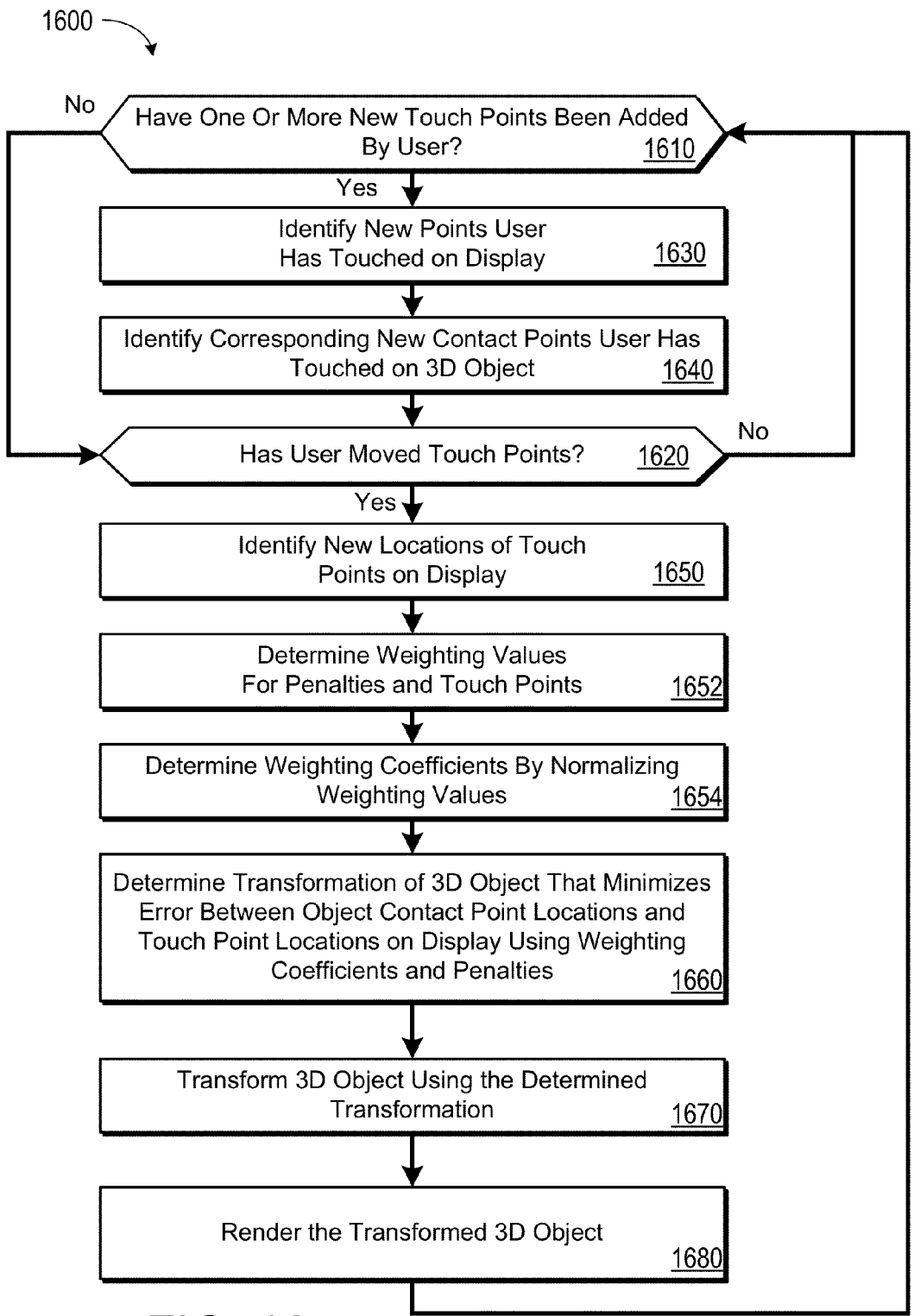
FIG. 16 is a flow diagram of a process for enabling a user to manipulate 3D objects through a 2D display interface that restricts motion of the 3D objects using penalties.

FIG. 16 is a flow diagram of an example process 1600 for moving simulated 3D objects in response to one or more inputs on a substantially 2D display interface that restrains movement of the 3D objects using penalties and distributes slippage errors among touch points in a controlled manner. The process 1600 may be implemented by a 2D display interface device such as, for example, a multi-touch display device.

Operations 1610, 1620, 1630, 1640 and 1650 of process 1600 may be performed, for example, in the same manner described previously with respect to operations 310, 320, 330, 340 and 350, respectively, of process 300. After having identified the new locations of the touch points on the 2D display interface, the 2D display interface device determines weighting values for the penalties and for the touch points (1652). The choice of penalties to be applied for a given interaction is determined by the application and is typically fixed. However, in some implementations, the application may dynamically change the choice of penalties based on characteristics of touch points or of the interactions. In such implementations, the 2D display interface device may, for example, choose the appropriate penalty functions after operation 1650 and prior to or at the same time as operation 1652.

The weighting values for the penalties are also typically fixed to predetermined values by the application in accordance with the principles discussed previously. However, in some implementations the weighting values for the penalties, like those of the touch points, may vary based on the characteristics of one or more of the touch points such as, for example, the distance traveled by one or more of the touch points from an initial location, whether one or more of the touch points are stationary or moving, and/or the pressure applied by the user at one or more of the touch points. The 2D display interface device may, for example, use any of the touch point weighting schemes described previously, either alone or in combination with other weighting schemes, to determine the appropriate weighting values for each penalty. The 2D display interface device also may determine the weighting values for the touch points, for example, in the manner described previously with respect to FIG. 13.

The 2D display interface device normalizes the touch point and penalty weighting values to determine weighting coefficients (1654). A normalized weighting coefficient for a penalty or touch point may be, for example, equal to the weighting value for the penalty or touch point divided by the sum the weighting values for all of the penalties and touch points.

The 2D display interface device then determines a transformation of the 3D object that minimizes the slippage or error between the screen-space locations of the touch points and the screen-space locations of their corresponding contact points using the weighting coefficients (1660). Operation 1660 may be performed, for example, in the same manner as described previously with respect to operation 360 of process 300 with the exception that the terms of the energy function that is being minimized now include the weighting coefficients to distribute the error or slippage among the different touch points and penalties. In some implementations, the 2D display interface device applies an algorithm to minimize the previously described energy function E with weighting coefficients. The 2D display interface device then transforms the 3D object using the determined transformation (1670) and renders the transformed 3D object for display on the 2D display interface (1680).

Figure 17:
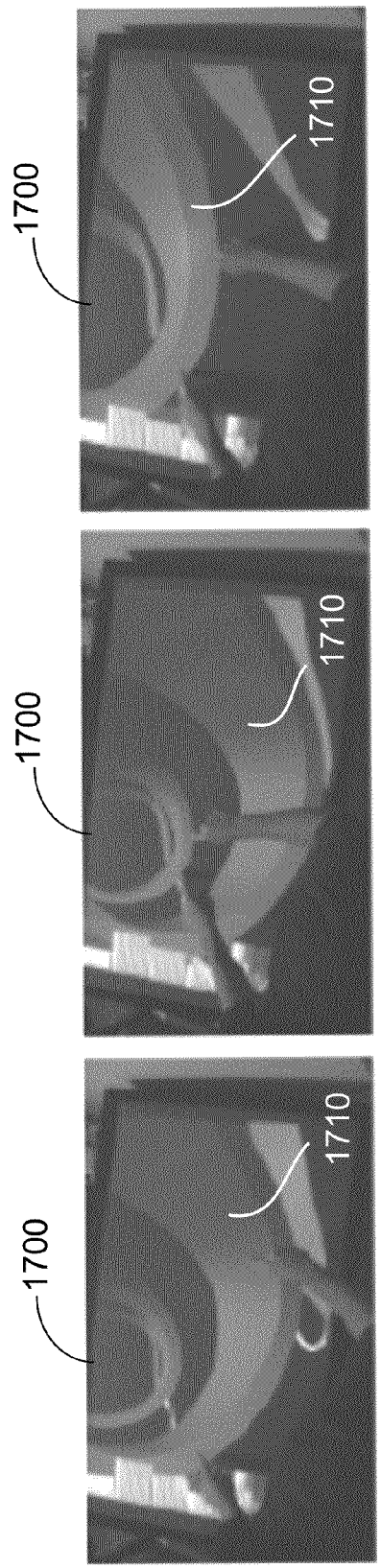
FIG. 17 is a sequence of diagrams that illustrate a user navigation into a complex 3D object displayed on a 2D display interface.

In implementations where the object under control is much larger than the camera's field of view, the disclosed techniques also may be applied to navigation tasks. In such implementations, users may leverage preexisting multi-touch (or, more generally, multi-point) experiences to perform new multi-touch tasks (or, more generally, multi-point tasks), such as, for example, traversal through virtual environments. FIG. 17 shows a user performing RST-style interaction with a 2D display interface 1700 to navigate into a complicated model 1710.

Figure 18:
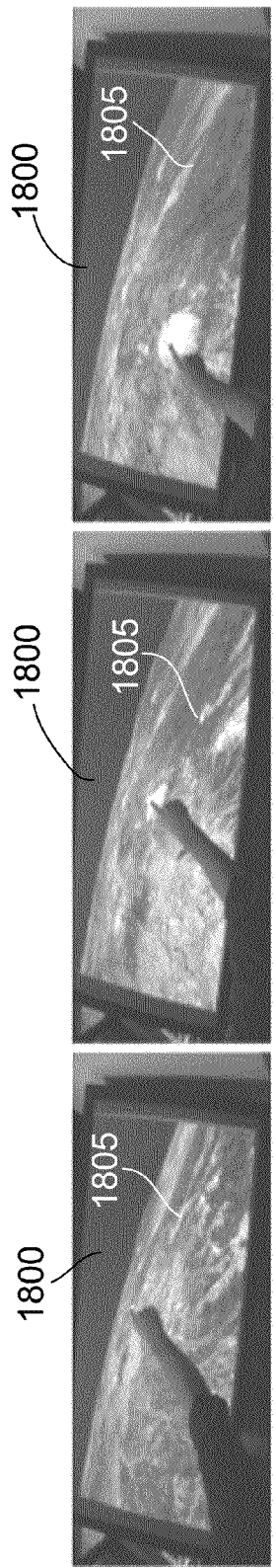
FIG. 18 is a sequence of diagrams that illustrate a one touch point interaction to navigate over the surface of a simulated 3D globe.

For objects that are not free-floating, the additional of some simple penalties may be employed by the application designer to ensure desired interactions. For example, as described previously, the application designer may constrain the center of a globe to always remain at the same location in world-space to thereby allow global navigation by the user. For single touch point interactions, the application executed by the 2D display interface device may make the globe rotate underneath the user's fingertip (or, more generally, touch point) by penalizing changes in the distance between the camera and the center of the globe. Since the user can then spin the globe with a single finger (or, more generally, touch point) without affecting the camera's distance to the globe, the presence of these two penalties may allow the disclosed techniques to mimic an Arcball controller. This interaction still behaves correctly at arbitrary camera orientations, such as is shown in FIG. 18, which depicts a single point interaction with a simulated globe 1805 displayed in a 2D display interface 1800.

Figure 19:
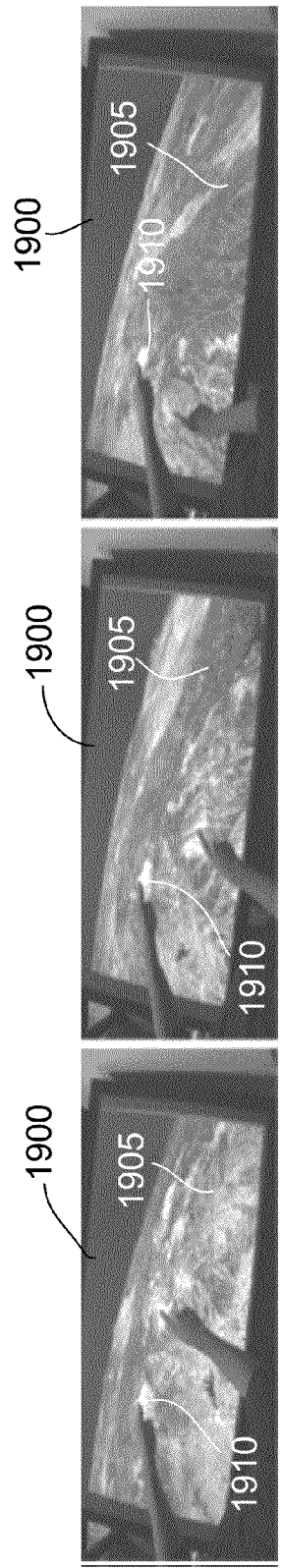
FIG. 19 is a sequence of diagrams that illustrate a two touch point interaction to navigate over the surface of a simulated 3D globe.

For terrain navigation interactions involving two or more touch points, the distance penalty may be dropped by the application designer. The user of the 2D display interface device may be able to zoom in and out with two fingers, and tilt the globe or change perspective with three or more fingers. Because the 2D display interface device operates in screen-space, terrain interactions, such as pinning one point on the surface down to a particular location on screen, and then spinning the earth around it may be permitted. FIG. 19 is a sequence of diagrams that depict this type of interaction. Specifically, as shown in FIG. 19, the user has pinned down a mountain 1910 displayed on a globe 1905 in the 2D display interface 1900 and is spinning the globe 1905 around it. As shown in the sequence of diagrams of FIG. 19, the position of the mountain does not change on the 2D display interface 1900.

The described methods, and techniques may be implemented by a 2D display interface device embodied in digital electronic circuitry, computer hardware, firmware, software, or in combinations of these elements. The 2D display interface device implementing these techniques may be an apparatus that includes appropriate input and output devices, a computer processor, and a tangible computer-readable storage medium on which a computer program or other computer-readable instructions are stored for execution by one or more processing devices (e.g., a programmable processor).

A process embodying these techniques may be performed by a 2D display interface device that includes a programmable processor executing a program of instructions to perform desired functions by operating on input data and generating appropriate output. The techniques may be implemented in one or more computer programs that are executable on a 2D display interface device that is a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Suitable processors include, by way of example, both general and special purpose microprocessors. Generally, a processor will receive instructions and data from a read-only memory and/or random access memory. Storage devices suitable for storing computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed application-specific integrated circuits (ASICs).

The various techniques for manipulating displayed content described herein generally are described in the context of 2D display interface device that are multi-touch display devices, which are configured to receive multiple inputs at the same time.

The various different techniques for manipulating displayed content described herein may be implemented both on multi-touch display devices that require physical contact with the surface of the multi-touch display device in order to received input and multi-touch display devices that do not require physical contact with the surface of the multi-touch display device in order to receive input. For example, the displayed content manipulation techniques described herein may be implemented on multi-touch display devices that receive input by detecting contact with the surface of the multi-touch display device by a finger, a stylus, some other mechanical, electro-mechanical, or magnetic input mechanism and/or any combination of multiple such input mechanisms at the same time. Additionally or alternatively, the various different displayed content manipulation techniques described herein may be implemented on multi-touch display devices that receive input by detecting the presence of an input mechanism in the vicinity of the surface of the multi-touch display device but that do not necessarily require physical contact to be made with the surface of the multi-touch display device to receive input. Such multi-touch display devices may be configured to receive input by detecting the presence of a finger, a stylus, some other mechanical, electro-mechanical, or magnetic input mechanism and/or any combination of multiple such input mechanisms in the vicinity of the surface of the multi-touch display device even when such input mechanisms are not in physical contact with the surface of the multi-touch display device.

The various different techniques for manipulating displayed content described herein also may be implemented in any other type of multi-point computing system configured to receive multiple inputs at the same, including, for example, systems configured to receive concurrent input from multiple pointing devices (e.g., multiple computer mice) and/or concurrent input from one or more pointing devices and another input device (e.g., a keyboard). Another example of a multi-point input computing system within which the controls described herein may be implemented is a multi-point input capable standalone tablet without an integrated display.

In implementations in which variations in pressure applied at one or more points on the 2D display interface are used to inform and affect manipulation of displayed content, the 2D display interface device may include a pressure sensor capable of differentiating between different levels of applied pressure. In some implementations, the pressure sensor may detect the size of a contact area (i.e., the surface area of the contact area) at a touch point, and the 2D display interface device may estimate an applied pressure value at that touch point based on the detected contact area size. For example, when fingers are used to place the touch points, the larger the size of the contact area of a finger at a touch point, the larger value of applied pressure at that touch point. The pressure sensor may, for example, use optical, electromagnetic, piezoelectric and/or capacitive sensing technologies to detect the size of the contact area or the otherwise detect and differentiate between different levels of applied pressure at a touch point.

Various modifications may be made. For example, useful results still may be achieved if steps of the disclosed techniques are performed in a different order and/or if components of the disclosed systems are combined in a different manner and/or replaced or supplemented by other components. Furthermore, the addition of penalties specified by metrics such as the speed of the user's fingers may be useful in guiding the optimization (i.e., error reduction or minimization) process into more faithfully capturing the user's intent. Additionally, techniques to implement "undo" operation, by backtracking through solution space can be performed. Finally, the disclosed techniques may be integrated with optimization (i.e., error reduction or minimization) algorithms that allow hard constraints. In such implementations, the penalty framework may not be discarded. Rather, hard constraints and penalties may be used together in tandem to ensure desired interactions.

What is claimed is:

1. A method of manipulating a three-dimensional object displayed in a multi-touch display device, the method comprising:
    displaying the object in two dimensions on the display device, the object having an initial three-dimensional location and an initial three-dimensional rotational orientation;
    detecting one or more input mechanisms touching one or more touch points on the display device;
    determining a two-dimensional location of each of the one or more touch points on the display device;
    determining, for each of the one or more touch points, a three-dimensional contact point on a surface of the object that corresponds to the two-dimensional location of the touch point;
    detecting a change in applied pressure by the one or more input mechanisms at a selected one of the touch points that corresponds to a selected one of the contact points;
    determining a target depth value for the selected contact point based on the change in applied pressure at the selected touch point;
    calculating a three-dimensional transformation of the object by specifying at least one of a new three-dimensional rotation and a new three-dimensional location for the object, and reducing a difference between a depth value of the selected contact point after the object transformation and the target depth value;
    transforming the object using the three-dimensional transformation such that the transformed object is positioned and rotated in accordance with the at least one of the new three-dimensional location and the new three-dimensional rotation; and
    displaying the transformed three-dimensional object on the display device.

2. The method of claim 1, wherein displaying the object in two dimensions further comprising projecting the object onto an image plane of a camera, and the method further comprises:
    accessing a current depth value of the selected contact point, the selected contact point being projected for display onto the image plane of the camera at the location of the selected touch point, and the current depth value of the selected contact point representing a depth of the selected contact point along a Z-axis of the camera away from the image plane.

3. The method of claim 2, wherein the selected contact point is projected for display onto the image plane of the camera at the two-dimensional location of the selected touch point, and the transformed three-dimensional object is displayed by projecting the transformed three-dimensional object onto the image plane of the camera.

4. The method of claim 1, further comprising reducing deviation between projected two-dimensional locations of the three-dimensional contact points after the object has been transformed and two dimensional locations of the touch points corresponding to the contact points.

5. The method of claim 1, further comprising determining a surface area of a contact area of the one or more touch points.

6. The method of claim 5, wherein detecting a change in the applied pressure is based on the surface area of the contact area.

7. The method of claim 5, wherein a pressure sensor determines the surface area of the contact area of the one or more touch points, and the pressure sensor utilizes sensing technology selected from the group consisting of optical, electromagnetic, piezoelectric, and capacitive sensing technologies.

8. The method of claim 1, further comprising:
    for each of the one or more touch points that is both stationary and at which a current pressure is greater than a predetermined threshold, assigning a first predetermined weight;
    for each of the one or more touch points that is not both stationary and at which a current pressure is greater than a predetermined threshold, assigning a second predetermined weight that is smaller than the first predetermined weight; and controlling an error distribution among the one or more touch points based at least in part on the first predetermined weight and the second predetermined weight.

9. The method of claim 8, wherein controlling the error distribution further comprises allocating less error to each of the one or more touch points that is both stationary and at which the current pressure is greater than the predetermined threshold as compared to each of the one or more touch points that is not both stationary and at which a current pressure is greater than a predetermined threshold.

10. The method of claim 8, further comprising concurrently using one or more other weighting schemes to assign the first predetermined weight and the second predetermined weight.

11. A multi-touch display device, comprising:
a processor; and
a program of instructions executable by the processor to manipulate a three-dimensional object displayed by the device, the program of instructions configured to:
display the object in two dimensions on the display device, the object having an initial three-dimensional location and an initial three-dimensional rotational orientation;
detect one or more input mechanisms touching one or more touch points on the display device;
determine a two-dimensional location of each of the one or more touch points on the display device;
determine, for each of the one or more touch points, a three-dimensional contact point on a surface of the object that corresponds to the two-dimensional location of the touch point;
detect a change in applied pressure by the one or more input mechanisms at a selected one of the touch points that corresponds to a selected one of the contact points;
determine a target depth value for the selected contact point based on the change in applied pressure at the selected touch point;
calculate a three-dimensional transformation of the object by specifying at least one of a new three-dimensional rotation and a new three-dimensional location for the object, and reducing a difference between a depth value of the selected contact point after the object transformation and the target depth value;
transform the object using the three-dimensional transformation such that the transformed object is positioned and rotated in accordance with the at least one of the new three-dimensional location and the new three-dimensional rotation; and
display the transformed three-dimensional object on the display device.

12. The multi-touch display device of claim 11, wherein the program of instructions is further configured to:
display the object in two dimensions by projecting the object onto an image plane of a camera, and the method further comprises; and
access a current depth value of the selected contact point, the selected contact point being projected for display onto the image plane of the camera at the location of the selected touch point, and the current depth value of the selected contact point representing a depth of the selected contact point along a Z-axis of the camera away from the image plane.

13. The multi-touch display device of claim 12, wherein the selected contact point is projected for display onto the image plane of the camera at the two-dimensional location of the selected touch point, and the transformed three-dimensional object is displayed by projecting the transformed three-dimensional object onto the image plane of the camera.

14. The multi-touch display device of claim 11, wherein the program of instructions is further configured to reduce deviation between projected two-dimensional locations of the three-dimensional contact points after the object has been transformed and two dimensional locations of the touch points corresponding to the contact points.

15. The multi-touch display device of claim 11, wherein the program of instructions is further configured to determine a surface area of a contact area of the one or more touch points.

16. The multi-touch display device of claim 15, wherein the program of instructions is further configured to detect a change in the applied pressure based on the surface area of the contact area.

17. The multi-touch display device of claim 15, further comprising a pressure sensor that determines the surface area of the contact area of the one or more touch points, wherein the pressure sensor utilizes sensing technology selected from the group consisting of optical, electromagnetic, piezoelectric, and capacitive sensing technologies.

18. The multi-touch display device of claim 11, wherein the program of instructions is further configured to:
for each of the one or more touch points that is both stationary and at which a current pressure is greater than a predetermined threshold, assign a first predetermined weight;
for each of the one or more touch points that is not both stationary and at which a current pressure is greater than a predetermined threshold, assign a second predetermined weight that is smaller than the first predetermined weight; and
control an error distribution among the one or more touch points based at least in part on the first predetermined weight and the second predetermined weight.

19. The multi-touch display device of claim 18, wherein the program of instructions is further configured to control the error distribution by allocating less error to each of the one or more touch points that is both stationary and at which the current pressure is greater than the predetermined threshold as compared to each of the one or more touch points that is not both stationary and at which a current pressure is greater than a predetermined threshold.

20. A method of manipulating a three-dimensional object displayed in a multi-touch display device, the method comprising:
displaying the object in two dimensions on the display device, the object having an initial three-dimensional location and an initial three-dimensional rotational orientation;
detecting one or more input mechanisms touching one or more touch points on the display device;
determining a two-dimensional location of each of the one or more touch points on the display device;
determining, for each of the one or more touch points, a three-dimensional contact point on a surface of the object that corresponds to the two-dimensional location of the touch point;
detecting a change in applied pressure by the one or more input mechanisms at a selected one of the touch points that corresponds to a selected one of the contact points;
determining a target depth value for the selected contact point based on the change in applied pressure at the selected touch point;
calculating a three-dimensional transformation of the object by specifying at least one of a new three-dimensional rotation and a new three-dimensional location for the object, and by reducing a difference between a depth value of the selected contact point after the object transformation and the target depth value;

transforming the object using the three-dimensional transformation such that the transformed object is positioned and rotated in accordance with the at least one of the new three-dimensional location and the new three-dimensional rotation;

reducing deviation between projected two-dimensional locations of the three-dimensional contact points after the object has been transformed and two dimensional locations of the touch points corresponding to the contact points; and after the deviation has been reduced, displaying the transformed three-dimensional object on the display device.

* * * * *